(12) United States Patent
Kim et al.

(10) Patent No.: US 12,108,157 B2
(45) Date of Patent: Oct. 1, 2024

(54) MOBILE DEVICE AND METHOD OF CONTROLLING MOBILE DEVICE CRADLE

(71) Applicant: 3I INC., Daegu (KR)

(72) Inventors: Ken Kim, Seoul (KR); Ji Wuck Jung, Goyang-si (KR)

(73) Assignee: 3I INC., Daegu (KR)

( * ) Notice: Subject to any disclaimer, the term of this patent is extended or adjusted under 35 U.S.C. 154(b) by 102 days.

(21) Appl. No.: 17/878,134

(22) Filed: Aug. 1, 2022

(65) Prior Publication Data

US 2022/0408026 A1    Dec. 22, 2022

Related U.S. Application Data

(63) Continuation of application No. PCT/KR2021/012650, filed on Sep. 16, 2021.

(30) Foreign Application Priority Data

May 18, 2021    (KR) .......................... 10-2021-0064238
May 18, 2021    (KR) .......................... 10-2021-0064239

(51) Int. Cl.
*G06V 20/00* (2022.01)
*F16M 11/08* (2006.01)
(Continued)

(52) U.S. Cl.
CPC ........... *H04N 23/695* (2023.01); *F16M 11/08* (2013.01); *F16M 13/04* (2013.01); *G06V 20/10* (2022.01);
(Continued)

(58) Field of Classification Search
CPC .... H04N 23/695; H04N 23/61; H04N 23/632; H04N 23/611; H04N 5/265; F16M 11/08;
(Continued)

(56) References Cited

U.S. PATENT DOCUMENTS 8,566,498 B2 * 10/2013 Lemarchand ......... H04L 67/306
710/303
8,605,158 B2 * 12/2013 Yoshizumi ............. H04N 23/62
348/207.1
(Continued)

FOREIGN PATENT DOCUMENTS

JP    2017-181766 A    10/2017
KR    10-2009-0006261 A    1/2009
(Continued)

OTHER PUBLICATIONS

International Search Report issued on Jan. 28, 2022 in counterpart Patent Application No. PCT/KR2021/012650 (3 pages in Korean).

*Primary Examiner* — Frank F Huang
(74) *Attorney, Agent, or Firm* — NSIP Law

(57) ABSTRACT

A mobile device which operates in conjunction with a mobile device cradle is provided. The mobile device is a mobile device which is held by a mobile device cradle and controls the mobile device cradle to be driven, and may include at least one camera which captures a forward image, a display, and at least one processor which executes an application which detects a subject from the forward image and controls the mobile device cradle to be driven so that a forward direction of the mobile device follows the subject according to movement of the subject.

18 Claims, 25 Drawing Sheets

(51) Int. Cl.
    *F16M 13/04*         (2006.01)
    *G06V 20/10*         (2022.01)
    *H04N 23/61*         (2023.01)
    *H04N 23/63*         (2023.01)
    *H04N 23/695*        (2023.01)
    *H04M 1/72409*     (2021.01)

(52) U.S. Cl.
    CPC ........... *H04N 23/61* (2023.01); *H04N 23/632* (2023.01); *H04M 1/72409* (2021.01); *H04M 2250/52* (2013.01)

(58) Field of Classification Search
    CPC ........ F16M 13/04; F16M 11/18; F16M 13/00; G06V 20/10; H04M 1/72409; H04M 2250/52; H04M 1/04
    See application file for complete search history.

(56) References Cited

U.S. PATENT DOCUMENTS

| | | | |
|---|---|---|---|
| 9,491,416 B2 * | 11/2016 | Kamei | H04N 7/185 |
| 9,595,838 B2 * | 3/2017 | Tanabe | H02J 50/12 |
| 9,780,590 B2 * | 10/2017 | Nguyen | H02J 7/0068 |
| 10,038,843 B2 * | 7/2018 | Kitagawa | H04N 23/667 |
| 2006/0279253 A1 * | 12/2006 | Kawai | H04N 23/661 348/E5.043 |
| 2018/0222499 A1 * | 8/2018 | Gomes | G06V 20/52 |
| 2018/0237041 A1 * | 8/2018 | Mesher | G06T 7/001 |
| 2020/0158656 A1 * | 5/2020 | Chung | B61L 23/047 |
| 2020/0186778 A1 * | 6/2020 | Meyer | H04N 13/189 |
| 2020/0349743 A1 * | 11/2020 | Kitamura | H04N 7/181 |
| 2021/0146974 A1 * | 5/2021 | Wang | H04B 7/0695 |
| 2021/0392265 A1 * | 12/2021 | Kim | H04N 23/631 |
| 2022/0408026 A1 * | 12/2022 | Kim | H04M 1/04 |

FOREIGN PATENT DOCUMENTS

| | | |
|---|---|---|
| KR | 10-0883467 B1 | 2/2009 |
| KR | 10-1184690 B1 | 9/2012 |
| KR | 10-2015-0089340 A | 8/2015 |
| KR | 10-2017-0086392 A | 7/2017 |
| KR | 10-1850534 B1 | 4/2018 |
| KR | 10-2238530 B1 | 4/2021 |

\* cited by examiner

MOBILE DEVICE AND METHOD OF CONTROLLING MOBILE DEVICE CRADLE

CROSS-REFERENCE TO RELATED APPLICATIONS

This application is a PCT Continuation By-Pass application of PCT Application No. PCT/KR2021/012650 filed on Sep. 16, 2021, which claims the benefit under 35 USC § 119(a) of Korean Patent Application No. 10-2021-0064238 filed on May 18, 2021, and Korean Patent Application No. 10-2021-0064239 filed on May 18, 2021, in the Korean Intellectual Property Office, the entire disclosures of which are incorporated herein by reference for all purposes.

BACKGROUND

Field

The examples relate to a mobile device operating in conjunction with a mobile device cradle, a method of controlling the mobile device cradle using the same, and a method of combining images using the same.

Description of Related Art

With developments of electronic and communication technologies, the performance and functions of mobile devices are also developed. For example, in addition to long-distance or short-range wireless communication functions, camera functions and storage functions of mobile devices are developed. Accordingly, functions of existing cameras or camcorders can be utilized using a single mobile device.

When an image or the like captured using such a mobile device, a person directly manipulates the mobile device to capture an image or fixes the mobile device to a fixing device such as a tripod to capture an image.

However, when a person directly takes a picture, the person can freely take the picture such as changing an image capturing direction of a camera, but since the person fixedly holds the camera, there is a limitation in that shaking occurs. Meanwhile, when the fixing device such as the tripod is used, there is a limitation in that an image can be captured only at a specific angle.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

One aspect of the present invention provides a mobile device which operates in conjunction with a mobile device cradle. The mobile device is a mobile divide, which is held by the mobile device cradle and controls the mobile device cradle to be driven, and includes at least one camera which generates a forward image, a display which displays the forward image, and at least one processor which detects a subject from the forward image and controls a mobile device cradle to be driven so that a forward direction of the mobile device follows the subject according to movement of the subject. The at least one processor determines a following direction on the basis of a position of the subject in the forward image.

Another aspect of the present invention provides a method of controlling a mobile device cradle. The method of controlling a mobile device cradle is a method of controlling a mobile device cradle, which is performed by a mobile device held by the mobile device cradle and configured to control the mobile device cradle to be driven, and includes obtaining a forward image, detecting a subject from the forward image, and controlling the mobile device cradle to be driven so that a forward direction of the mobile device follows the subject according to movement of the subject.

Still another aspect of the present invention provides a storage medium in which computer-readable instructions are stored. The storage medium stores the instructions, and when the instructions are executed by a mobile device—which is held by a mobile device cradle and controls the mobile device cradle to be driven—, the mobile device performs an operation of obtaining a forward image, an operation of detecting a subject from the forward image, and an operation of controlling a mobile device cradle to be driven so that a forward direction of the mobile device follows the subject according to movement of the detected subject.

Yet another aspect of the present invention provides a method of combining images. The method of combining images is a method of combining images, which is performed by a mobile device held by a mobile device cradle and configured to control the mobile device cradle to be driven, and includes obtaining a first image in a first image capturing direction, controlling the mobile device cradle to be driven so that the mobile device faces a second image capturing direction different from the first image capturing direction, obtaining a second image in the second image capturing direction, and generating a composite image by combining the first image and the second image on the basis of a common portion between the first image and the second image.

Yet another aspect of the present invention provides a mobile device which operates in conjunction with a mobile device cradle. The mobile device is a mobile device, which is held by the mobile device cradle and controls the mobile device cradle to be driven, and includes at least one camera which captures a forward image, a display, and at least one processor which executes an application which obtains a first image in a first image capturing direction, controls the mobile device cradle to be driven so that the mobile device faces a second image capturing direction different from the first image capturing direction, and obtains a second image in the second image capturing direction, and the at least one processor may generate a composite image by combining the first image and the second image on the basis of a common portion between the first image and the second image.

Yet another aspect of the present invention provides a storage medium in which computer-readable instructions are stored. The storage medium stores the computer-readable instructions, and when the instructions are executed by a mobile device—which is held by the mobile device cradle and controls the mobile device cradle to be driven—the mobile device performs an operation of obtaining a first captured image in a first image capturing direction, an operation of controlling the mobile device cradle to be driven so that the mobile device faces a second image capturing direction different from the first image capturing direction, an operation of obtaining a second image in the second image capturing direction, and an operation of a composite image by combining the first image and the second image on the basis of a common portion between the first image and the second image.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
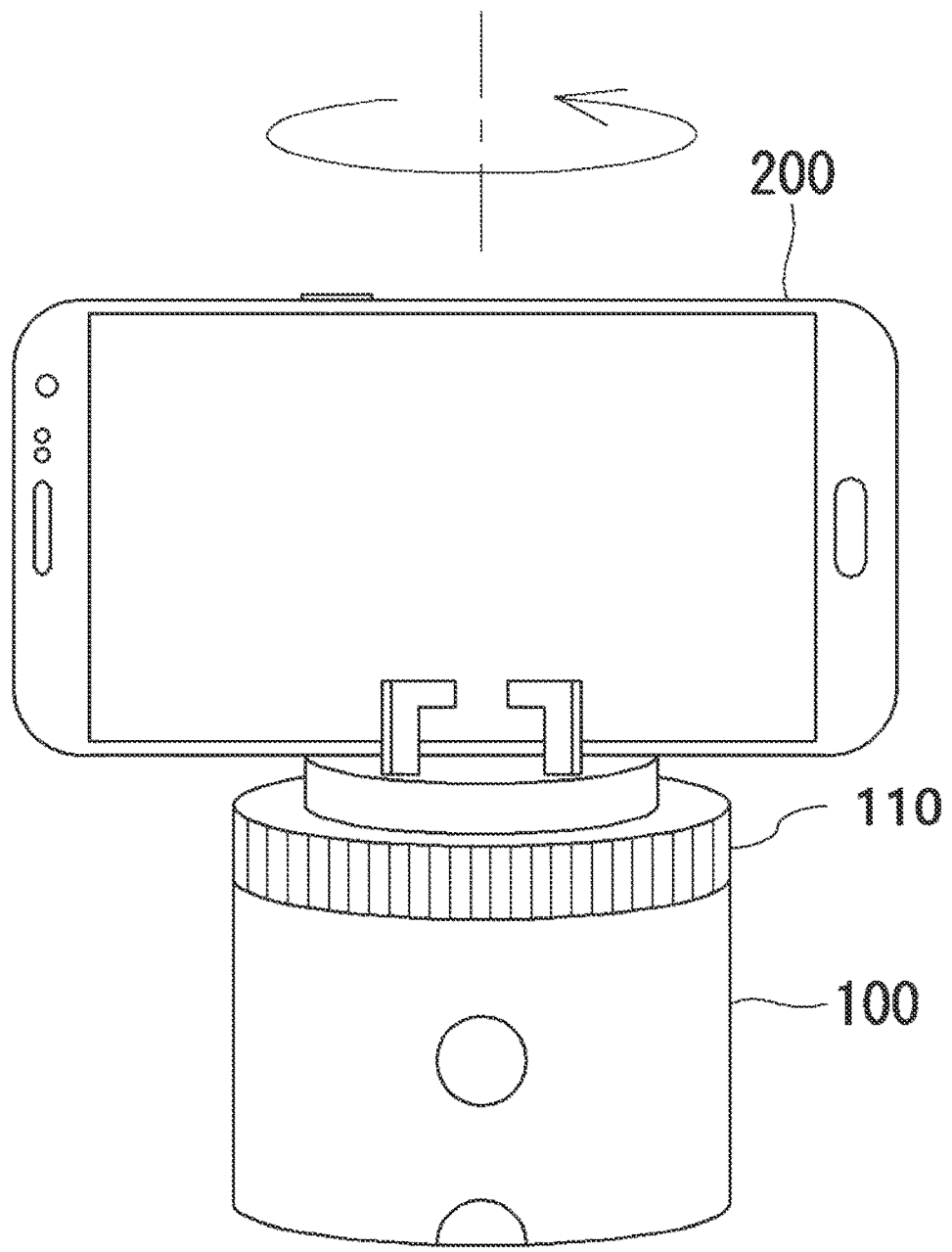
FIG. 1 is a view illustrating a mobile device cradle and a mobile device operating in conjunction with the mobile device cradle according to one embodiment disclosed in the present specification.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The examples are directed to providing a mobile device capable of controlling driving of a mobile device cradle to capture an image even in a situation in which a subject moves.

The examples are directed to providing a mobile device capable of controlling a mobile device cradle to easily capture images at different angles and easily combining the images.

According to one embodiment disclosed in the present specification, since a mobile device controls a mobile device cradle to be driven so that the mobile device traces and aims a moving subject even when the subject moves, the mobile device can capture an image of the moving subject without user intervention.

In addition, according to the embodiment disclosed in the present specification, there is an effect of efficiently and rapidly detecting and tracing a position of the subject.

According to one embodiment disclosed in the present specification, since the mobile device controls the mobile device cradle to be driven, the mobile device can accurately and conveniently capture images at different angles.

In addition, according to the embodiment disclosed in the present specification, the mobile device can easily and conveniently combine a plurality of images captured at different angles.

In addition, according to the embodiment disclosed in the present specification, since the mobile device displays a clear zone, accuracy of image combination can be improved and a convenient guide line can be provided to a user.

Various embodiments of the present specification may be implemented as software (for example, a program) including one or more commands stored in a storage medium (for example, a memory 240) which is readable by a machine (for example, a mobile device 200). For example, a processor (for example, a processor 260) of the machine (for example, the mobile terminal 200) may calls and executes at least one command of the one or more commands stored in the storage medium. This allows the machine to operate at least one function to be performed according to the at least one called command. The one or more commands may include codes generated by a compiler or codes executable by an interpreter. The machine-readable storage medium may be provided as a type of non-transitory storage medium. In this case, the term "non-transitory" only means that the storage medium is a tangible device and does not include a signal (for example, an electromagnetic wave), and the term does not distinguish a case in which data is semi-permanently stored in a storage medium and a case in which data is temporarily stored in a storage medium.

According to embodiments, methods according to various embodiments disclosed in the present specification may be provided to be included in a computer program product. The computer program product may be traded between a seller and a buyer as a commodity. The computer program product may be distributed in the form of a machine-readable storage medium (for example, compact disc read only memory (CD-ROM)), distributed (for example, downloaded or uploaded) online through an application store (for example, Play Storer™), or directly distributed between two user devices (for example, smartphones). In the case of the online distribution, at least a part of the computer program product may be at least temporarily stored or generated in a machine-readable storage medium such as a memory of a manufacture's server, an application store's server, or a relay server.

According to various embodiments, each component (for example, a module or program) of the above-described components may include a single object or a plurality of objects. According to the various embodiments, among the corresponding components described above, one or more components or operations may be omitted, or one or more components or operations may be added. Generally or additionally, a plurality of components (for example, modules or programs) may be integrated into one component. In this case, the integrated component may perform one or more functions of each component among the plurality of components in the same way as or similar way to those performed before the corresponding components among the plurality of components are integrated. According to the various embodiments, operations performed by modules, programs, or the other components may be performed sequentially, parallelly, or heuristically, one or more of the operations may be performed in different order or be omitted, and one or more operations may be added.

Although various flowcharts are given to describe embodiments of the present invention, this is for the sake of convenience in the description of operations, and the operations are not necessarily performed in order of the flowchart. That is, the operations in the flowchart may be performed at the same time, performed in the order according to the flowchart, or performed in the reverse order of the order in the flowchart.

FIG. 1 is a view illustrating a mobile device cradle and a mobile device operating in conjunction with the mobile device cradle according to one embodiment disclosed in the present specification.

In FIG. 1, a mobile device cradle 100 and a mobile device 200 which operates in conjunction with the mobile device cradle are illustrated.

The mobile device cradle 100 may be a device by which the mobile device 200 is held, operate in conjunction with the mobile device 200 according to a driving control signal provided by, for example, the mobile device 200, and change an image capturing direction (hereinafter, a forward direction) of the mobile device 200.

Hereinafter, an example in which the mobile device cradle 100 rotates in a horizontal direction to turn the image capturing direction, that is, the forward direction of the mobile device 200 in the horizontal direction will be described, but it is for the sake of convenience in the description, and the present invention is not limited thereto. For example, the mobile device cradle 100 may vertically tilt the mobile device 200 or simultaneously perform horizontal rotation (fanning) and vertical rotation (tilting) on the mobile device 200.

The mobile device 200 detects a subject from a forward image and control the mobile device cradle 100 to be driven so that the forward direction of the mobile device 200 continuously faces the subject even when the subject moves.

In this case, the forward direction is a direction in which the mobile device 200 held by the mobile device cradle 100 captures an image, and the forward image is an image captured by the mobile device 200 held by the mobile device cradle 100.

The mobile device 200 detects a subject from a forward image which is being captured by the mobile device 200 and controls the mobile device cradle 100 to be driven so that a forward direction of the mobile device 200 follows the subject according to movement of the detected subject.

The mobile device 200 is a user-portable electrical device and includes, for example, a mobile phone, a smart phone, a laptop computer, a digital broadcasting terminal, personal digital assistants (PDAs), a portable multimedia player (PMP), a navigation, a slate personal computer (PC), a tablet PC, an ultrabook, or a wearable device, and for example, a smartwatch, a smart glass, or a head mounted display (HMD).

Although the mobile device 200 is a device that is separate from the mobile device cradle 100, the mobile device cradle 100 may be driven by control of the mobile device 200. As an example, a dedicated program—for example, an application for a smart phone—for operating in conjunction with the mobile device cradle 100 is installed in the mobile device 200, and the user may control the mobile device cradle 100 to be driven using the dedicated program installed in the mobile device.

The mobile device 200 may determine a driving direction of the mobile device cradle on the basis of a position of a subject in a forward image. For example, the mobile device 200 may set a partial region in the forward image in which the position of the subject is restricted and determine the driving direction of the mobile device cradle so that the subject is positioned in the partial region in the forward image.

The mobile device 200 may control the mobile device cradle 100 to be drive to perform various functions. The mobile device 200 may provide not only a function of tracing the subject described above but also a function of matching images obtained in different forward directions. For example, the mobile device 200 may control the mobile device cradle 100 to be driven so that the mobile device obtains a first image in a first image capturing direction and faces in a second image capturing direction different from the first image capturing direction. Then, the mobile device 200 may obtain a second image in the second image capturing direction. The mobile device 200 may generate a composite image by combining the first image and the second image on the basis of a common portion between the first image and the second image.

The mobile device 200 will be described in more detail with reference to FIGS. 3 to 14 below.

Figure 2:
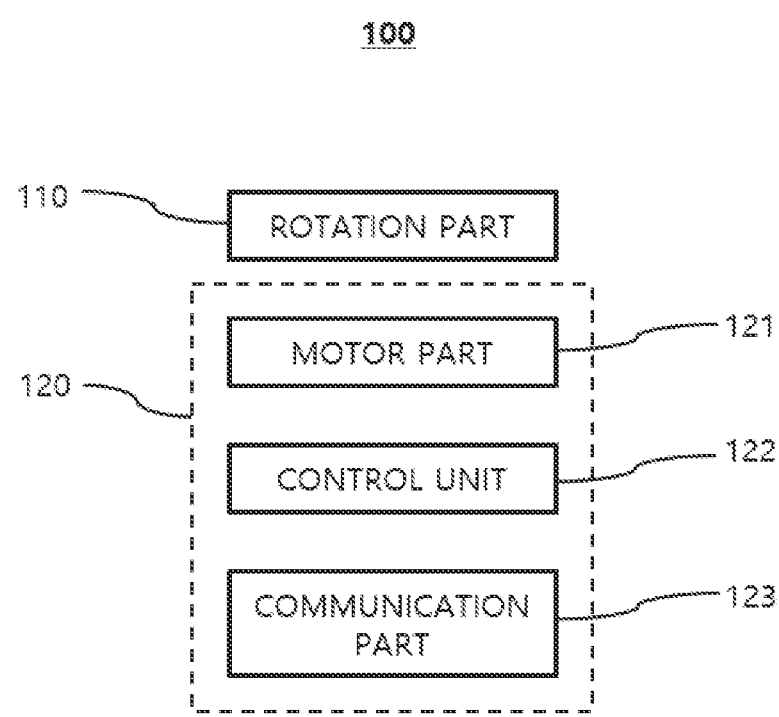
FIG. 2 is a block diagram for describing the mobile device cradle according to one embodiment disclosed in the present specification.

FIG. 2 is a block diagram for describing the mobile device cradle according to one embodiment disclosed in the present specification.

One example of the mobile device cradle 100 according to the embodiment of the present invention will be described with reference to FIGS. 1 and 2.

The mobile device cradle 100 may include a rotation part 110 and a body part 120. The mobile device 200 may be held by the rotation part 110, and the rotation part 110 may be rotated by a motor part 121. A forward direction of the mobile device 200 may be changed according to the rotation of the rotation part 110. In addition, a rotation direction and a rotation speed of the rotation part 110 may be changed by driving control of the motor part 121.

As an example, the rotation part 110 may include a fixing base, a fastener, and a rotating base. The fixing base and the fastener may be disposed on the rotating base. The fixing base and the fastener may fix the mobile device 200. The user may fix the mobile device 200 not to be shaken by positioning the mobile device 200 between the fixing base and the fastener and fastening the fastener. The rotating base may rotate according to an operation of the motor part 121, and to this end, the motor part 121 may be connected to the rotating base to be driven.

The body part 120 may include the motor part 121, a control unit 122, and a communication part 123. The control unit 122 may control components of the body part 120 to control an operation of the mobile device cradle 100.

The communication part 123 may establish a communication connection with the mobile device 200 and receive a driving control signal for driving the mobile device cradle 100 from the mobile device 200. As an example, the communication part 123 may establish a communication connection with the mobile device 200 using at least one of a short-range wireless communication module or wired communication.

The control unit 122 may drive the motor part 121 to control the rotation part 110 to be driven in response to the driving control signal received through the communication part 123.

Hereinafter, the driving control signal transmitted from the mobile device 200 to the mobile device cradle 100 will be described as a control signal related to driving of the mobile device cradle 100—as an example, rotation operation in the horizontal direction, but is for the sake of convenience in the description, and the present is not limited thereto. That is, according to the embodiment, the driving control signal transmitted from the mobile device 200 to the mobile device cradle 100 may include control information about power on/off of the mobile device cradle 100, a request for a wireless link establishment, authentication, display of a remaining amount of a battery capacity, and the like in addition to information for controlling of rotational driving of the rotation part 110 of the mobile device cradle 100.

Figure 3:
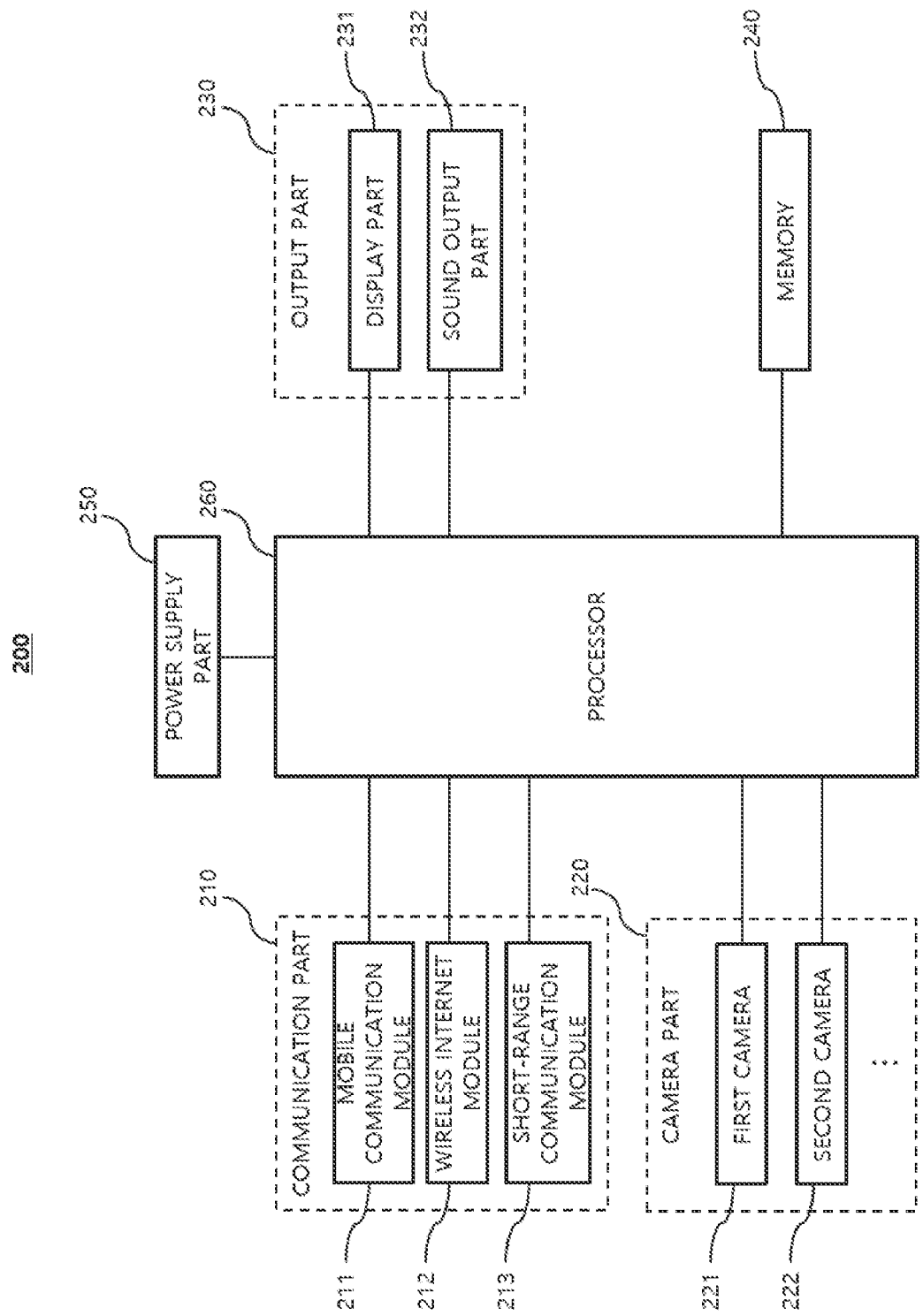
FIG. 3 is a block diagram for describing the mobile device according to one embodiment disclosed in the present specification.

FIG. 3 is a block diagram for describing the mobile device according to one embodiment disclosed in the present specification.

Referring to FIG. 3, the mobile device 200 includes a communication part 210, a camera part 220, an output part 230, a memory 240, a power supply 250, and a processor 260. Since components illustrated in FIG. 3 are not essential for implementing the mobile device, the mobile device may include only some of the listed components or additionally include components which are not listed above.

The communication part 210 may include one or more modules to allow communication between the mobile device 200 and a wireless communication system, between the mobile device 200 and another mobile device 200, or between the mobile device 200 and the mobile device cradle 100. The communication part 210 may include a mobile communication module 211, a wireless Internet module 212, and a short-range communication module 213. The short-range communication module 213 may establish a communication connection with the mobile device cradle 100 in a wireless or wired manner. For example, the short-range communication module 213 may include a short-range wireless communication module such as a Bluetooth module or a wired communication module for RS232.

The camera part 220 may include at least one camera. The camera part 220 may include one or more lenses, image sensors, signal processors, or flashlights.

The camera part 220 may include a first camera 221 and a second camera 222. The first camera 221 or the second camera 222 may capture a forward image of the mobile device 200.

The output part 230 may be a part for generating an output related to a visual sense, an auditory sense, a tactile sense, or the like and include a display part 231 and a sound output part 152. The display part 231 may form a mutual layer structure with a touch sensor or may be integrally formed with a touch sensor to form a touch screen. The touch screen may serve as a user input part providing an input interface between the mobile device 200 and the user and providing an output interface between the mobile device 200 and the user at the same time.

The power supply 250 receives external power or internal power and supplies the power to components included in the mobile device 200 under control of the processor 260. The power supply 250 may include a battery, and the battery may be an embedded battery or replaceable battery.

The processor 260 generally controls general operations of the mobile device 200 in addition to operations related to the application program. The processor 260 may process a signal, data, information, and the like input or output through the above-described components or drive an application program stored in the memory 240 to provide proper information or a function to the user or process the proper information or the function. The processor 260 may be implemented using one processor or a plurality of processors.

The processor 260 may control at least some of the components described with reference to FIG. 3 in order to drive the application program, that is, an application, stored in the memory 240. In addition, the processor 260 may combine and drive at least two components included in the mobile device 200 in order to drive the application program.

The processor 260 may execute instructions stored in the memory 240 to drive an application. Hereinafter, although it is described that the processor 260 is a main part of control, instruction, or function to drive the application, this means that the processor 260 drives and operates the instruction or application stored in the memory 240.

At least some of the components may cooperatively operate with each other in order to implement operation, control, or a control method of the mobile device according to various embodiments which will be described below. In addition, the operation, the control, or the control method of the mobile device may be implemented on the mobile device by driving of at least one application program stored in the memory 170.

Hereinafter, various controls and the like performed by the processor 260 will be described with reference to FIGS. 4 to 24.

Figure 4:
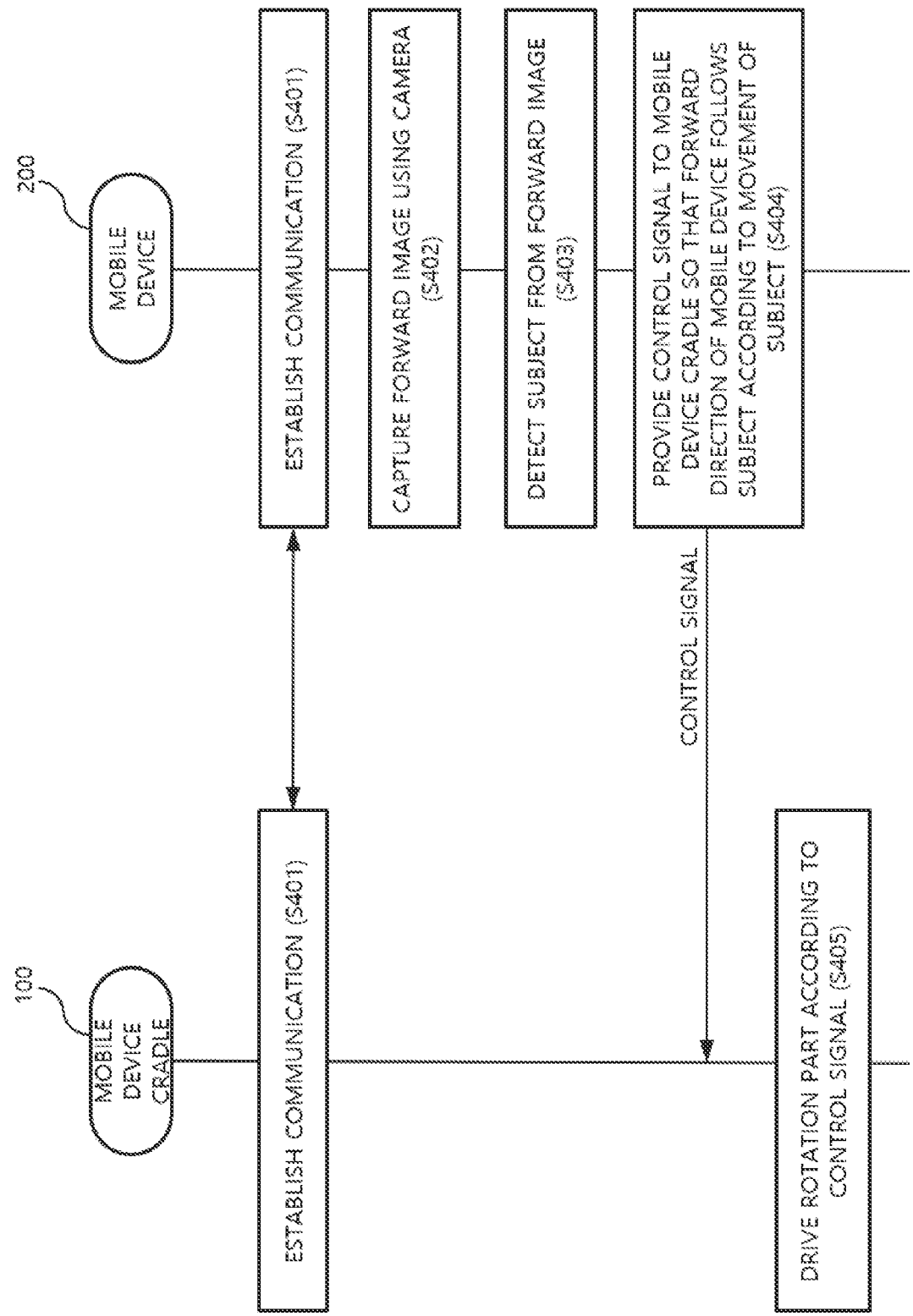
FIG. 4 is a flowchart for describing one example of a method of controlling the mobile device cradle performed by the mobile device according to one embodiment disclosed in the present specification.
Figure 5:
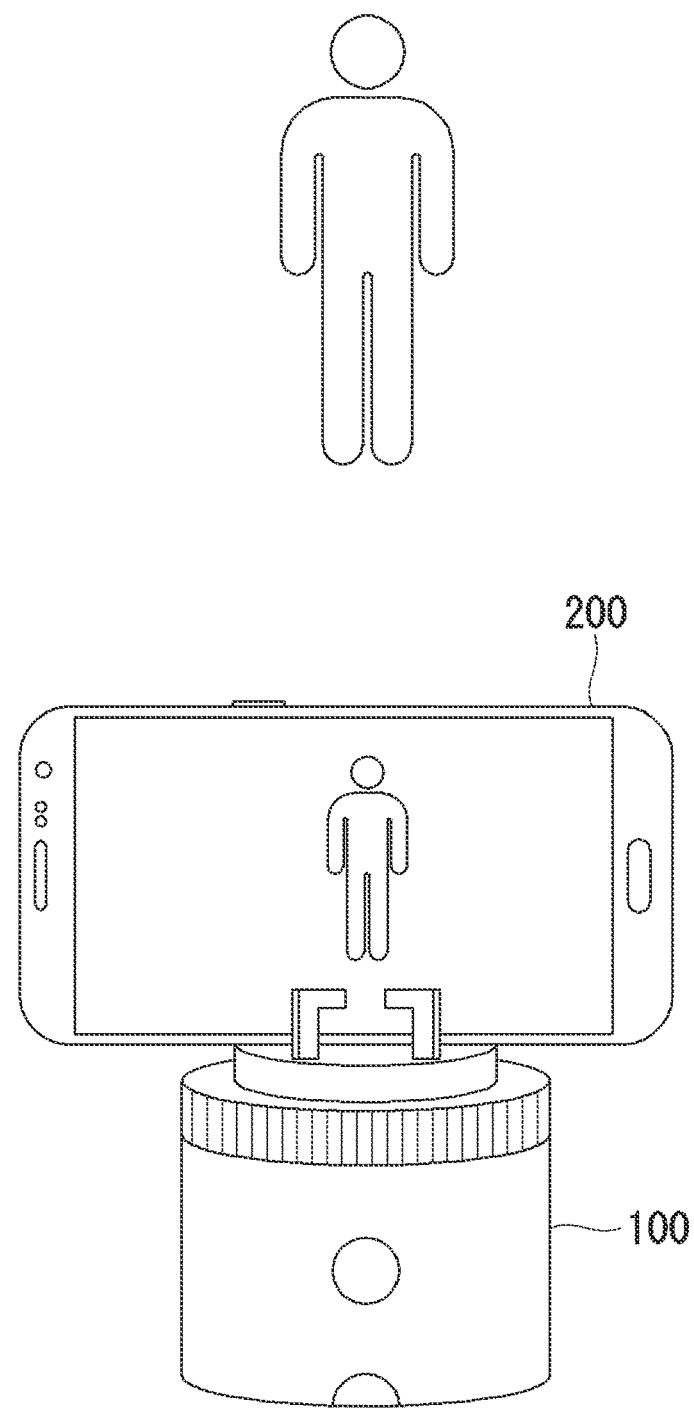
FIG. 5, FIG. 6, and FIG. 7 are views for describing the method of controlling the mobile device cradle illustrated in FIG. 4.
Figure 6:
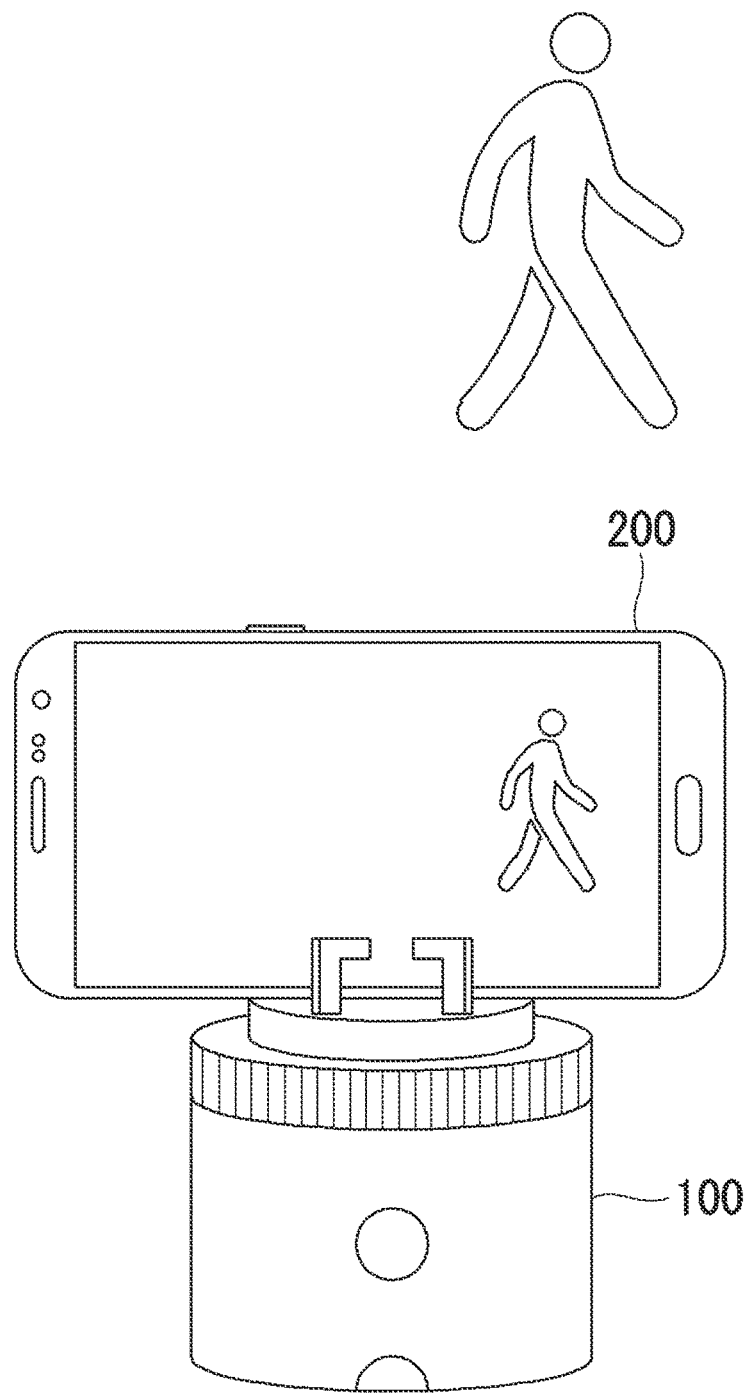
Figure 7:
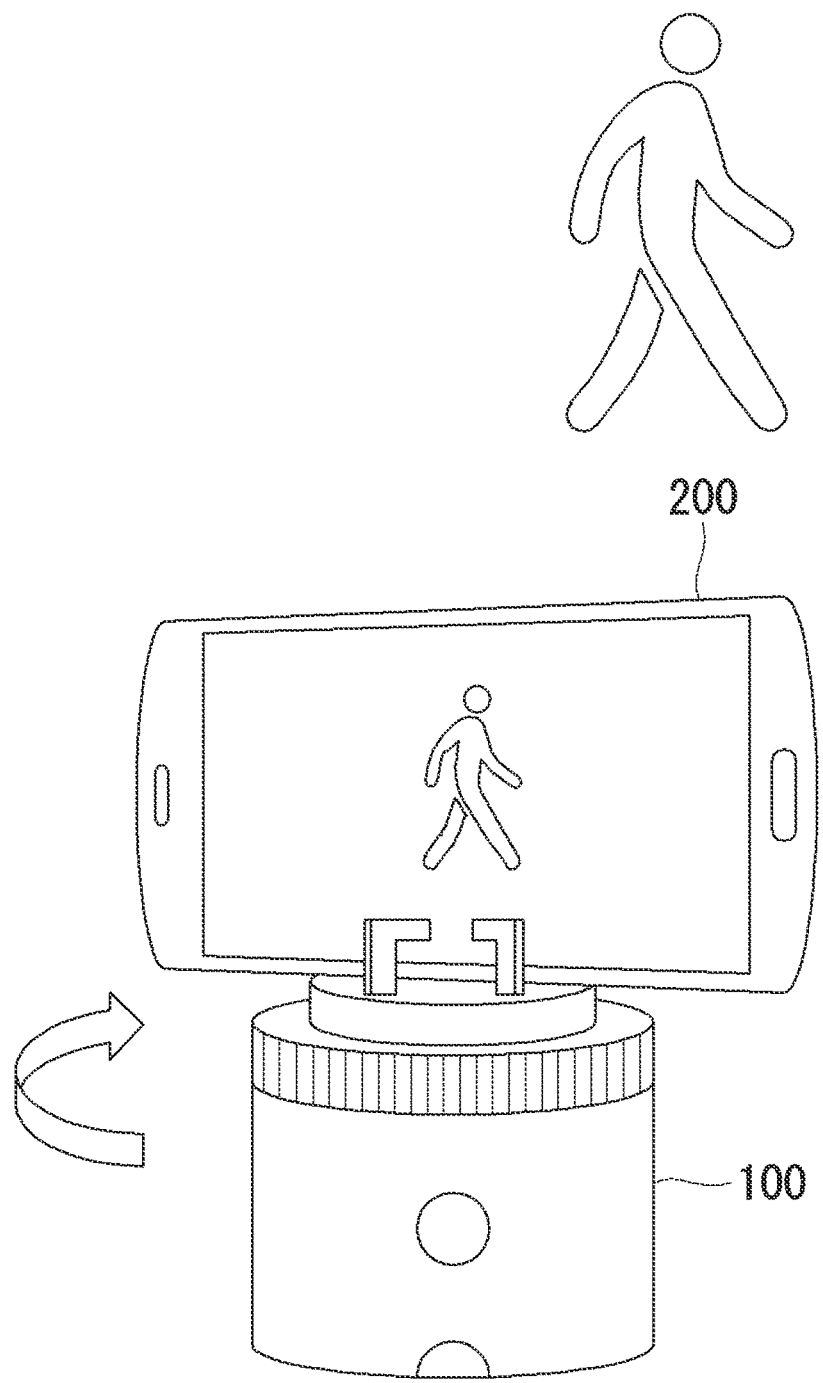

FIG. 4 is a flowchart for describing one example of a method of controlling the mobile device cradle performed by the mobile device according to one embodiment disclosed in the present specification, and FIGS. 5 to 7 are views for describing the method of controlling the mobile device cradle illustrated in FIG. 4.

Referring to FIG. 4, the processor 260 may establish a communication connection with the mobile device cradle 100 by controlling the short-range communication module 213 (S401).

The processor 260 may control the camera part 220 to obtain a forward image of the mobile device 200 (S401). In FIG. 5, an example in which the forward image is obtained by the mobile device 200 held by the mobile device cradle 100 according to control of the processor 260 is illustrated. In this case, an example of a case in which the mobile device cradle 100 may hold the mobile device 200 and perform a horizontal rotation operation so that a forward direction of the mobile device 200 faces in a right direction or left direction with respect to the forward direction will be described.

The processor 260 may detect a subject on the basis of image analysis for the forward image. For example, the processor 260 may set a human body, a human face, or the like as a detection target subject and detect whether there is a human body or human face in a forward image. Meanwhile, the detection target subject may be variously set. For example, the detection target subject may be an animal such as a horse or dog or an apparatus such as a bicycle.

As an example, the processor 260 may use a pre-trained learning model about a subject in order to detect the subject from a forward image. For example, the processor 260 may use a learning model which is implemented based on learning about various images corresponding to human bodies to distinguish objects corresponding to a human body. The learning model may be directly trained by the processor 260, or the processor 260 may receive and use a learning model trained by a separate server.

When a detected subject moves, the processor 260 may generate a control signal in order to control the mobile device cradle 100 to be driven so that a forward direction of the mobile device follows the subject according to the movement of the subject.

The processor 260 may determine a following direction on the basis of a position of the subject in a forward image. The processor 260 may generate a driving control signal to set a driving direction of the mobile device cradle 100 to correspond to the determined following direction.

In this case, the term "following" means that an image capturing direction, that is, a forward direct, of the mobile device 200 tracks the movement of the subject and, to this end, the processor 260 controls the mobile device cradle 100 to be rotationally driven according to the movement of the subject. The processor 260 provides the generated control signal to the mobile device cradle 100 through a communication connection.

Similarly to an example illustrated in FIG. 6, when an image of a state in which the subject moves in a right direction with respect to the forward direction is captured, since a position of the subject is in the right direction with respect to the forward direction, the processor 260 may generate a control signal to rotate the mobile device cradle 100 in the right direction.

The mobile device cradle 100 may drive the rotation part according to the control signal (S405). In FIG. 7, it shows that the moved subject is positioned in a partial region—a central portion in the illustrated example—in a forward image as a result of driving the rotation part performed by the mobile device cradle 100 according to the control signal.

When the forward image is changed according to the driving of the rotation part, the processor 260 may repeatedly perform the above-described operations S402 to S404 of obtaining the changed forward image and detecting and tracking an object of the subject.

Hereinafter, as one embodiment disclosed in the present specification, one example in which the processor 260 follows a subject, that is, tracking, will be described with reference to FIGS. 8 to 12.

Figure 8:
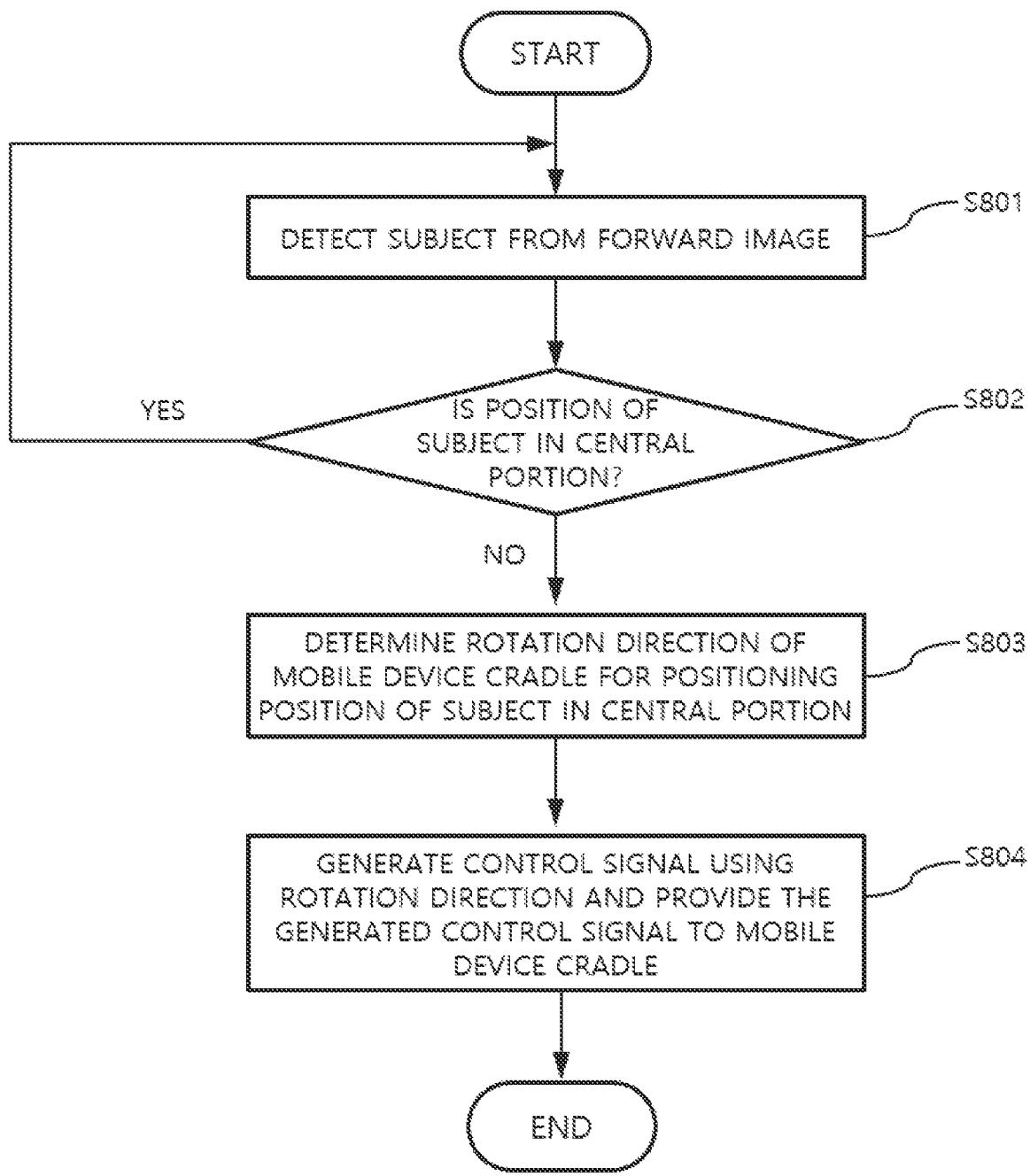
FIG. 8 is a flowchart for describing another example of the method of controlling the mobile device cradle performed by the mobile device according to one embodiment disclosed in the present specification.

FIG. 8 is a flowchart for describing another example of the method of controlling the mobile device cradle performed by the mobile device according to one embodiment disclosed in the present specification, and FIGS. 9 to 12 are views for describing another example of the method of controlling the mobile device cradle illustrated in FIG. 8.

FIGS. 8 to 12 are views related one example of positioning a position of a subject in a set partial region of a forward image in order to track the subject. Hereinafter, it will be described based on an example in which a preset partial region of a forward image for tracking a subject is set as a central portion of the forward image, but the present invention is not limited thereto. Accordingly, various regions such as one side portion or an upper portion of a forward region may be set to the preset partial region of the forward image.

Referring to FIG. 8, the processor 260 may perform image analysis on a forward image to detect a subject (S801). This may be easily understood from the content described above.

When the detected subject moves, the processor 260 may control the mobile device cradle 100 to be driven so that a forward direction of the mobile device follows the subject according to the movement of the subject.

As an example, the processor 260 may generate a control signal for a rotation operation so that the subject is positioned in a central portion of the forward image of the mobile device 200. That is, the processor 260 may determine a rotation direction of the mobile device cradle 100 in order to position the subject in the central portion of the current forward image.

Figure 9:
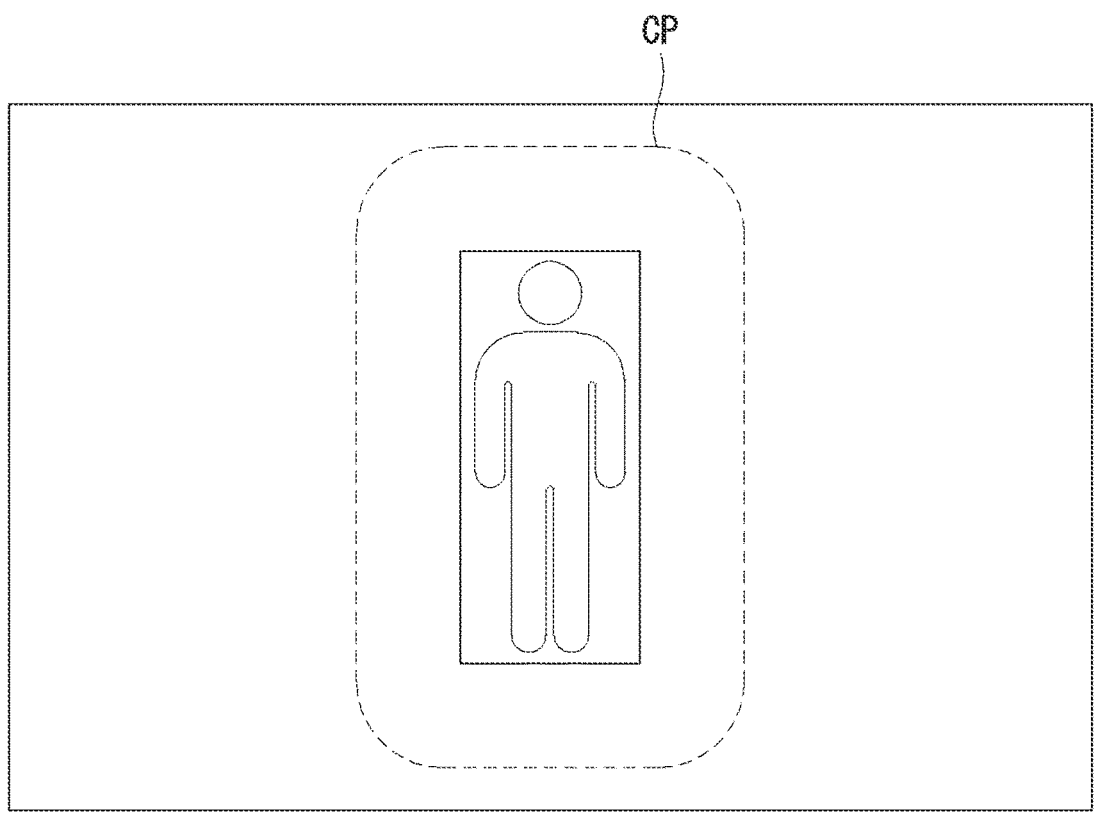
FIGS. 9 to 12 are views for describing another example of the method of controlling the mobile device cradle illustrated in FIG. 8.

In FIG. 9, an example of a forward image displayed on the mobile device 200 is illustrated. In the example of FIG. 9, the processor 260 may set a virtual central portion CP in the forward image. As an example, the central portion may be a region within a predetermined range based on a central point of the forward image, and the central portion may be variously set in a circular shape, an oval shape, a quadrangular shape, a quadrangular shape having round corners, or the like.

When the subject detected in the forward image is positioned in the central portion CP, the processor 260 does not control an operation of the mobile device cradle 100.

In the example of FIG. 9, the processor 260 may detect the subject from the forward image, and the subject is positioned in the central portion CP. Accordingly, in this case, the processor 260 does not control the mobile device cradle 100 such that the mobile device cradle 100 is not driven (S802).

Figure 10:
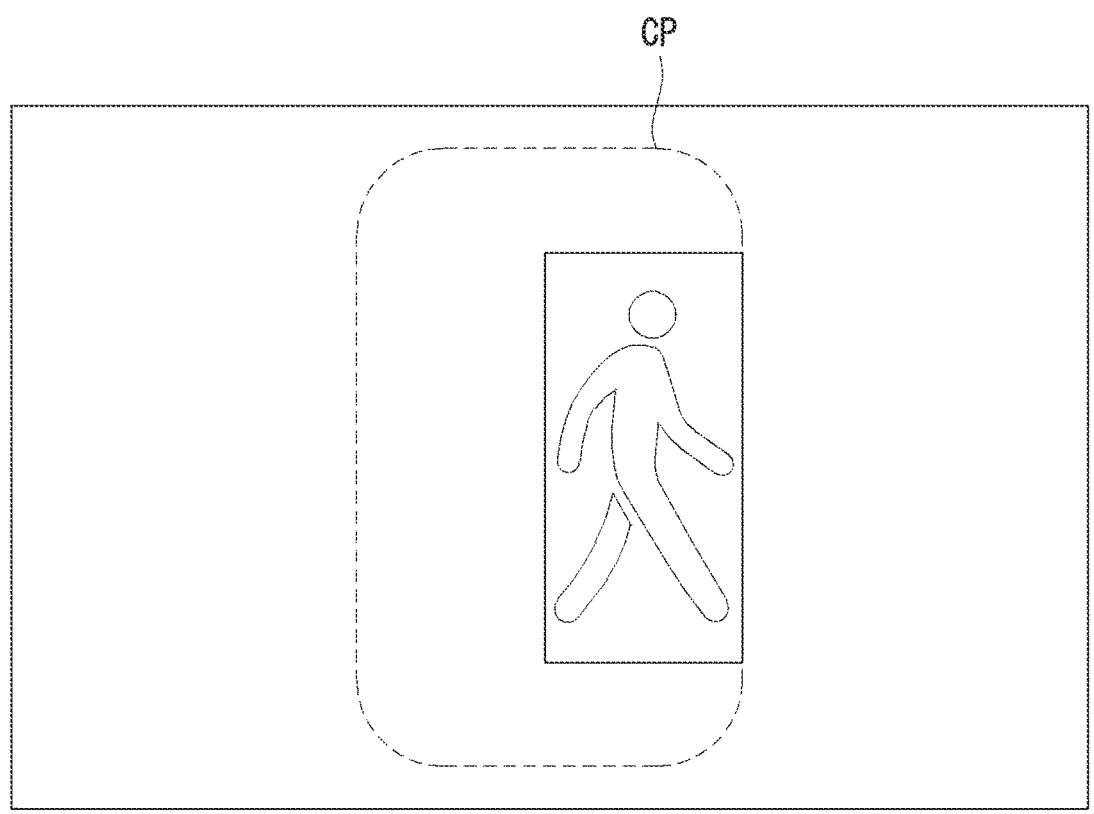

In FIG. 10, one example in which a subject moves in a right direction from a forward direction is illustrated. In the example of FIG. 10, the processor 260 may detect the subject, and since the detected subject is still positioned in the central portion CP, the processor 260 does not control the mobile device cradle 100 such that the mobile device cradle 100 is not driven (S802).

When the subject detected in a forward image is not positioned in the central portion CP, the processor 260 may generate a control signal for a rotation operation of the mobile device cradle 100 so that the position of the subject is moved to the central portion CP of the forward image.

Figure 11:
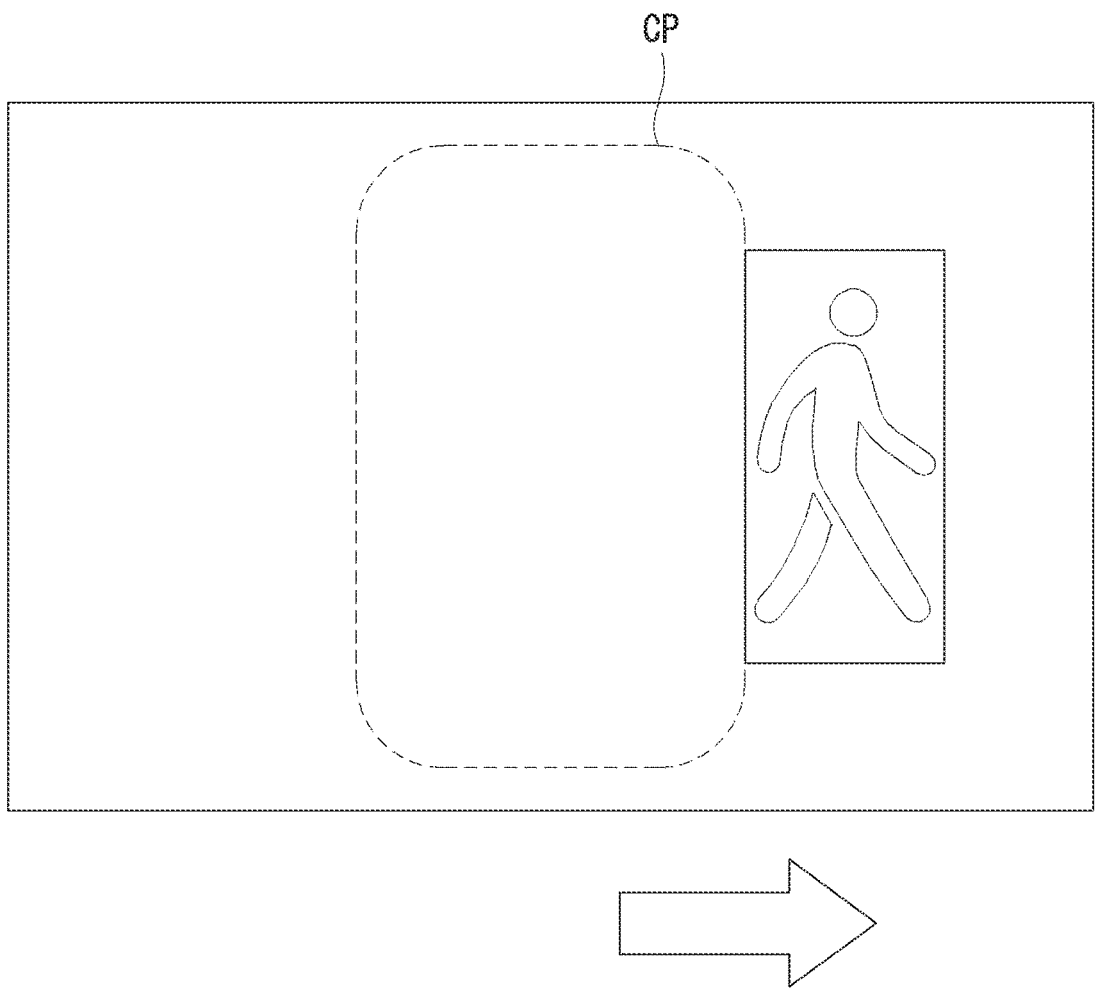

In FIG. 11, an example in which a subject further moves in a right direction from a forward direction is illustrated. In the example of FIG. 11, the processor 260 may detect the subject, and the detected subject is still positioned in a right direction with respect to the central portion CP, the processor 260 may set the right direction as a following direction, generate a driving control signal corresponding thereto, and provide the driving control signal to the mobile device cradle 100 so as to control driving of the mobile device cradle 100 to rotate in the right direction.

That is, the processor 260 detects the position of the subject in the forward image, and when the detected subject is positioned in a right portion or left portion with respect to the central portion CP instead of the central portion CP of the forward image, the processor 260 may set the rotation direction of the mobile device cradle 100 to the right direction or left direction so that the subject is positioned in the central portion CP (S803).

Figure 12:
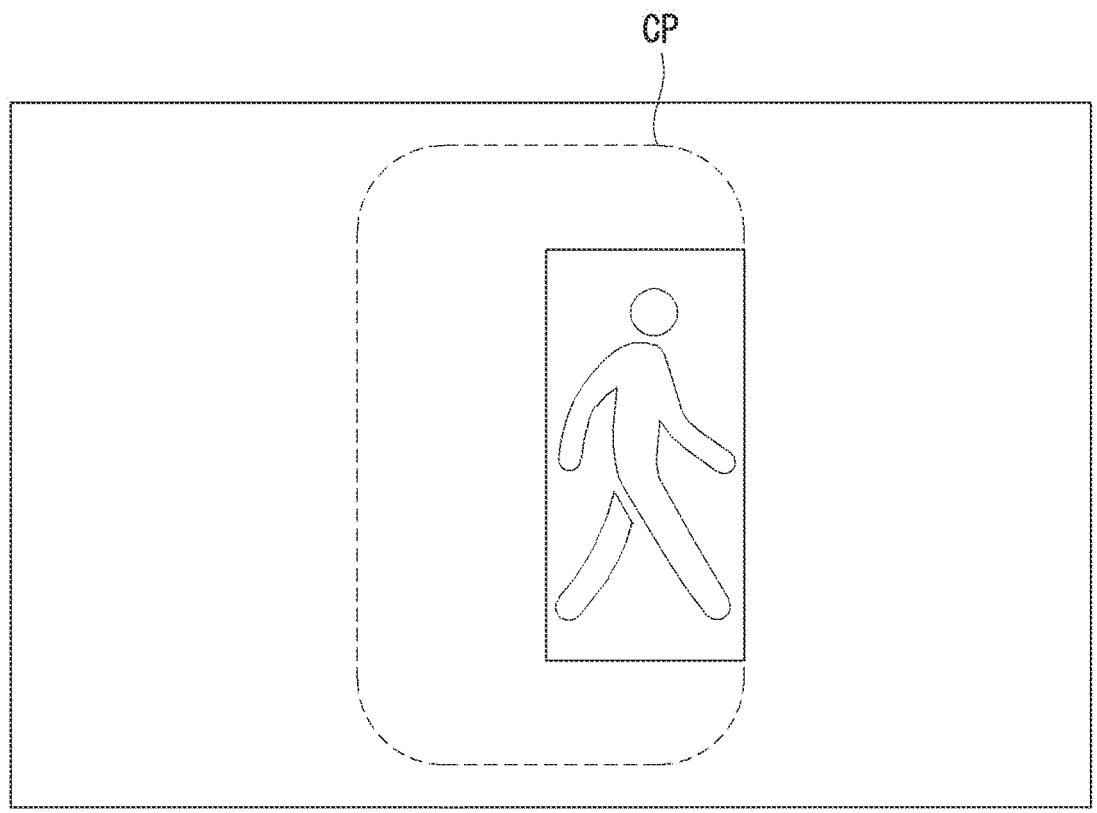

FIG. 12 is a view illustrating that, since the processor 260 provides the driving control signal to set the rotation direction to the right direction to the mobile device cradle 100 (S804), the mobile device cradle 100 rotates so that the subject is repositioned in the central portion CP.

In one embodiment, the processor 260 may perform following calculation on each predetermined frame. Specifically, the processor 260 may select a frame with respect to a forward image at each preset time interval. The processor 260 may determine a following direction with respect to the selected frame on the basis of a positional relationship between a position of a subject in the selected frame and a preset partial region. In this case, the following direction with respect to the selected frame is determined regardless of a following direction with respect to a previously selected frame. Accordingly, time intervals required to perform the following calculation may be secured by performing the following calculation on each predetermine frame, and resources required to perform the following calculation may be efficiently set.

Hereinafter, as one embodiment disclosed in the present specification, an example of setting a rotation speed of the mobile device cradle 100 calculated by the processor 260 will be described with reference to FIGS. 13 and 14.

Figure 13:
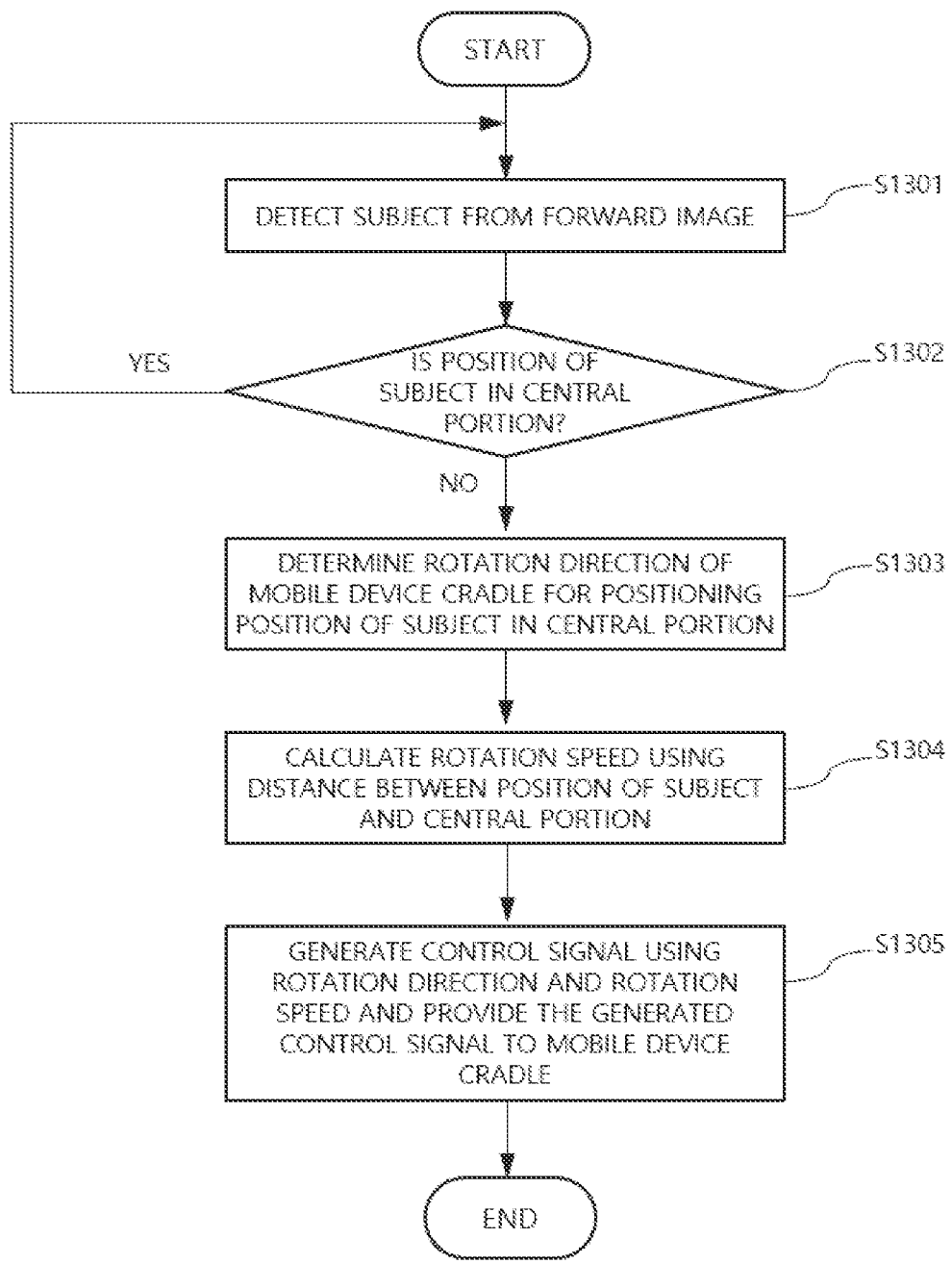
FIG. 13 is a flowchart for describing still another example of the method of controlling the mobile device cradle performed by the mobile device according to one embodiment disclosed in the present specification.
Figure 14:
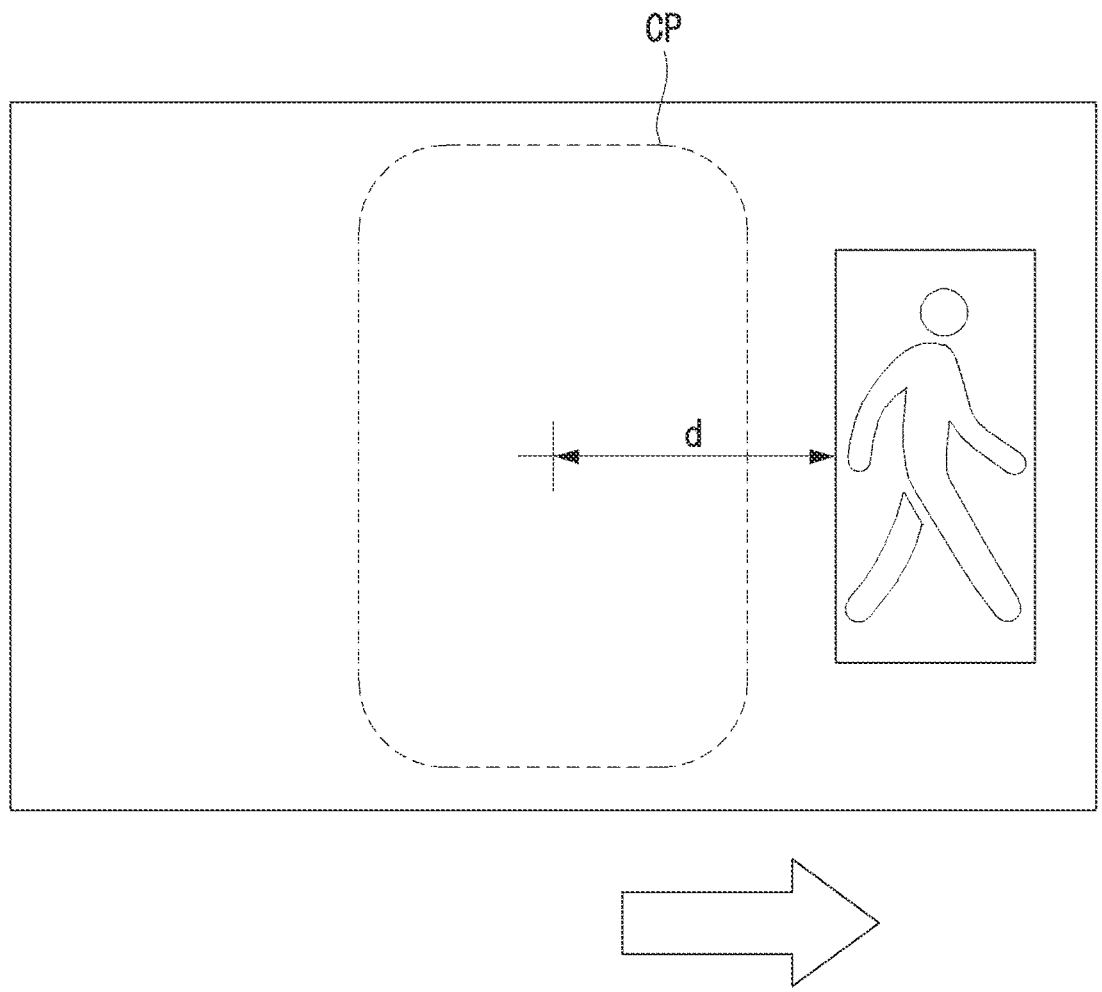
FIG. 14 is a view for describing still another example of the method of controlling the mobile device cradle illustrated in FIG. 13.

FIG. 13 is a flowchart for describing still another example of the method of controlling the mobile device cradle performed by the mobile device according to one embodiment disclosed in the present specification, and FIG. 14 is a view for describing still another example of the method of controlling the mobile device cradle illustrated in FIG. 13.

Referring to FIG. 13, the processor 260 performs image analysis on a forward image to detect a subject (S1301). This may be easily understood from the content described above.

The processor 260 may generate a control signal for a rotation operation so that the subject is positioned at a central portion in the forward image of the mobile device 200. That is, the processor 260 may detect the subject, and when the subject is positioned on one side surface instead of the central portion of the forward image (S1302, No), the processor 260 may determine a rotation direction of the mobile device cradle 100 so that the subject is positioned in the central portion (S1303).

In this case, the processor 260 may determine a rotation speed of the mobile device cradle 100 on the basis of a distance between the position of the subject and the central portion of the forward image in the forward image (S1304).

In the example of FIG. 14, an example in which the processor 260 sets a distance between the position of the subject and the central portion of the forward image on the basis of a distance d from a central point of the central portion to one end of the subject. However, this is an example, and the distance may be variously set such as from one end of the central portion to one end of the subject or from the central point of the central portion to the central point of the subject.

The rotation speed of the mobile device cradle 100 may be determined according to a length of the distance d. As the length of the distance d increases, since the subject is far away from the central portion, the rotation speed tends to be high.

As an example, the processor 260 may have data (for example, a lookup table) for a rotation speed of the mobile device cradle 100 preset according to a range of a distance d between a position of a subject and a central portion of a forward image and set a rotation speed using the data. As another example, the processor 260 may compare a preset reference distance and a distance d between a position of a subject and a central portion of a forward image and set a reference speed for the reference distance. Accordingly, the processor 260 may set a rotation speed by reflecting a ratio of a distance d to the reference distance to the reference speed. In addition, a rotation speed according to a distance d may be set in various manners.

The processor 260 may generate a control signal for a rotation operation of the mobile device cradle 100 by reflecting the rotation direction and the set rotation speed (S1305).

As one embodiment disclosed in the present specification, an example of a process of the processor 260 when a subject deviates from a forward image will be described.

When a subject deviates from a screen of a forward image in a first direction, the processor 260 may generate a control signal for a rotation operation so that rotation is performed at a highest rotation speed in the first direction.

The processor 260 may perform detection of the subject at each predetermined period or perform redetection after the detection for the subject is completely processed. Accordingly, the processor 260 may set a deviation direction of the subject from a position of the subject detected previously. For example, after the subject is recognized as illustrated in FIGS. 10 and 11, when redetection is performed, and the subject is not detected in a forward image, the processor 260 may determine that the subject deviates in a right direction.

In this case, the processor 260 may control the mobile device cradle 100 to rotate at a highest rotation speed in the right direction.

When the subject is redetected in a forward image while rotation is performed at the highest rotation speed in the right direction, the processor 260 may change the highest rotation speed to a set basic rotation speed while maintaining the same rotation direction. This is because, when the subject is redetected in the forward image while the rotation is performed at the highest rotation speed in the right direction, since there is a high possibility that the subject is still present in a right region of the forward image as illustrated in FIG. 11, the rotation is maintained in the same direction, and the highest rotation speed is changed to the basic rotation speed. When the subject is redetected in the forward image, and the redetected subject is present in a central portion CP of the forward image, the processor 260 may control the mobile device cradle 100 to stop the rotation and maintain a current direction.

In one embodiment, when a subject deviates from a screen of a forward image in a deviation direction, the processor 260 may distinguish the deviation direction into a first-axis deviation direction and a second-axis deviation direction and determine a driving direction using at least one of the first-axis deviation direction and the second-axis deviation direction. For example, the first axis and the second axis may be an X-axis and a Y-axis in the forward image, and the processor 260 may determine the driving direction using at least one of the two axes. For example, only horizontal rotation is possible, the X-axis may be set as an axis of a driving direction, and the horizontal rotation may be performed.

In one embodiment, when the subject deviate from the screen of the forward image in the deviation direction, the processor 260 may generate a driving control signal so that the mobile device cradle is driven at the highest rotation speed in a driving direction—corresponding to the deviation direction.

Figure 15:
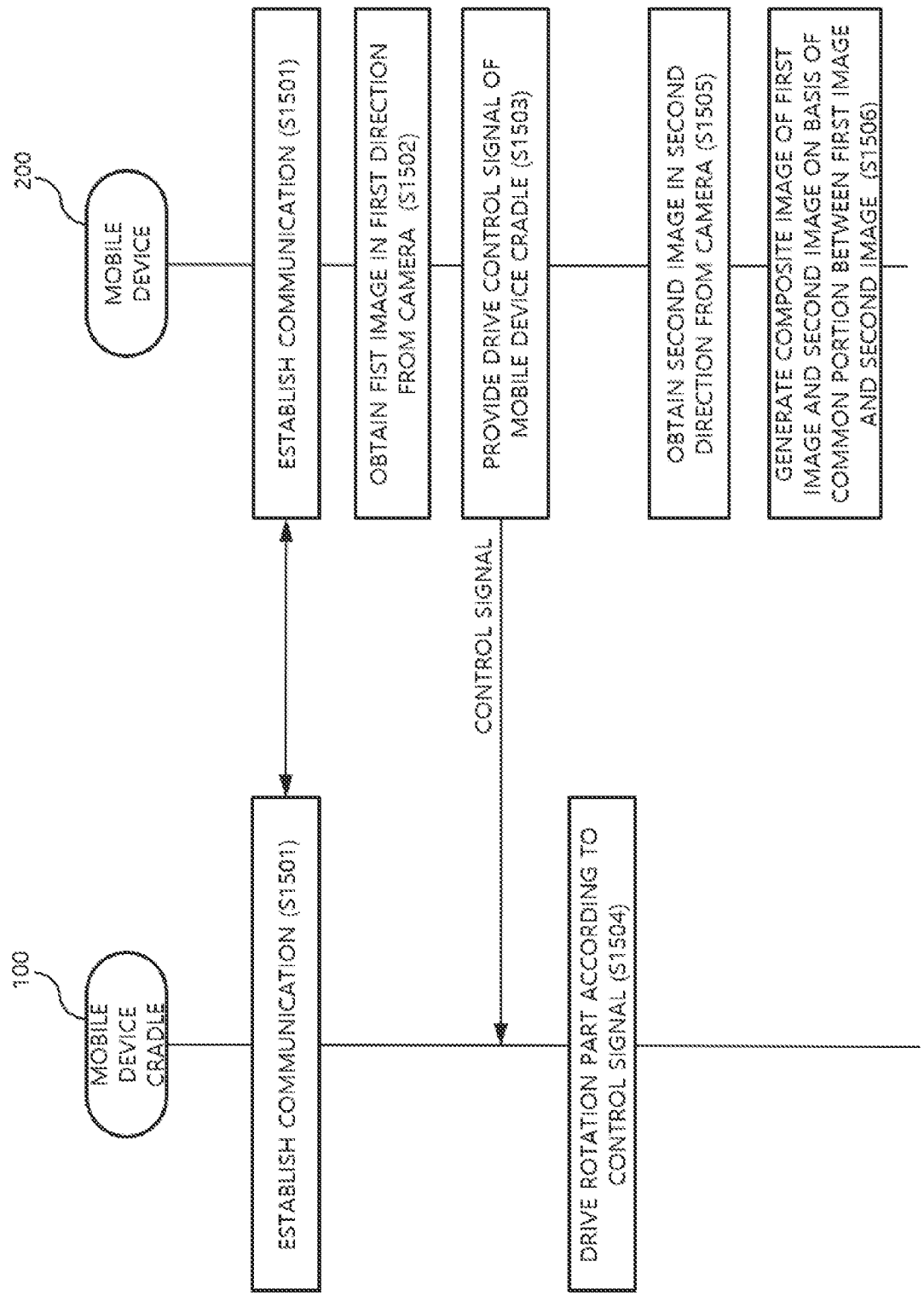
FIG. 15 is a flowchart for describing one example of the method of controlling the mobile device cradle performed by the mobile device according to one embodiment disclosed in the present specification.

FIG. 15 is a flowchart for describing one example of the method of controlling the mobile device cradle performed by the mobile device according to one embodiment disclosed in the present specification, and FIGS. 16 to 19 are views for describing one example of the method of controlling the mobile device cradle illustrated in FIG. 15.

Referring to FIG. 15, the processor 260 may establish a communication connection with the mobile device cradle 100 by controlling the short-range communication module 213 (S1501).

Figure 16A:
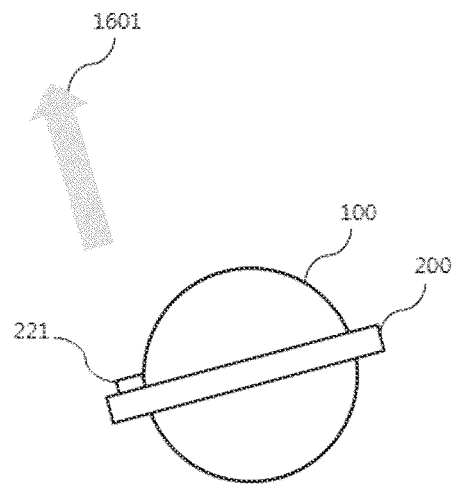
FIG. 16A, FIG. 16B, FIG. 16C, FIG. 17, FIG. 18, and FIG. 19 are views for describing one example of the method of controlling the mobile device cradle illustrated in FIG. 15.

The processor 260 may control the camera part 220 to obtain a forward image (first image) in a first image capturing direction of the mobile device 200 (S1502). In FIG. 16A, an example in which the mobile device 200 held by the mobile device cradle 100 obtains a first image in a first image capturing direction 1601 is illustrated.

The processor 260 may control the mobile device cradle 100 to be driven so that the mobile device 200 face in a second image capturing direction different from the first image capturing direction (S1503). Referring to an example of FIG. 16, in a state in which the mobile device cradle 200 holds the mobile device 200, driving of the mobile device cradle 100 may be controlled to perform rotation operation to change a forward direction of the mobile device from the first image capturing direction 1601 to a second image capturing direction 1602.

As an example, a rotation angle may be set so that at least a partial region of a forward image before rotation and a partial region of a forward image after rotation are common. This is to allow two images to be easily combined, and the processor 260 may allow a rotation operation to be performed at a preset rotation angle.

As one embodiment, the processor 260 may set a rotation angle of a rotation operation differently according to an image capturing mode. For example, in a standard mode, a rotation angle may be set to a reference rotation angle, and in a wide angle mode, a rotation angle may be set to a wide rotation angle greater than the reference rotation angle.

Figure 16B:
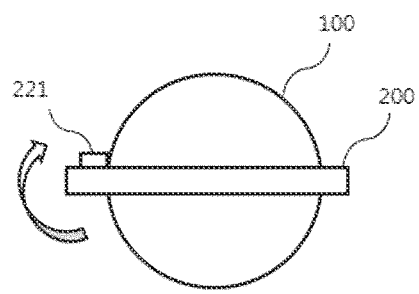
Figure 16C:
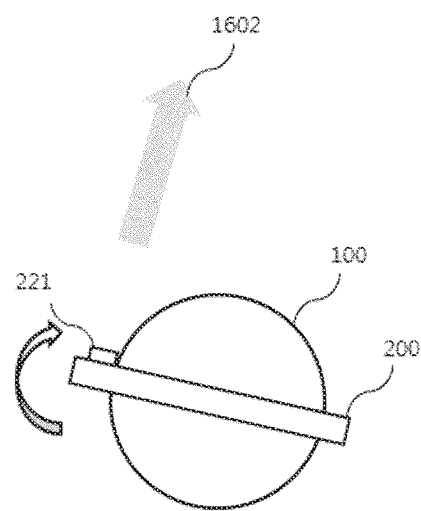

The mobile device cradle 100 may drive the rotation part according to a control signal provided by the processor 260 (S1504). FIGS. 16B and 16C are views illustrating a process in which an image capturing direction of the mobile device cradle 100 is changed from the first image capturing direction to the second image capturing direction, that is, the mobile device cradle 100 rotates in a clockwise direction.

Meanwhile, here, an example of a case in which a horizontal rotation operation of the mobile device cradle 100 is possible so that a forward direction of the mobile device 200 moves in the clockwise direction or a counter-clockwise direction in the state in which the mobile device cradle 100 holds the mobile device 200, but the present invention is not limited thereto. Accordingly, the mobile device cradle 100 may also be applied for driving of vertical tilting at a predetermined angle and the like.

The processor 260 may control the camera part 220 to obtain a forward image (second image) in the second image capturing direction 502 of the mobile device 200 (S1505).

Then, the processor 260 may combine the first image and the second image to generate a composite image on the basis of a common portion of the first image in the first image capturing direction 1601 and the second image in the second image capturing direction 1602 (S1506).

Figure 17:
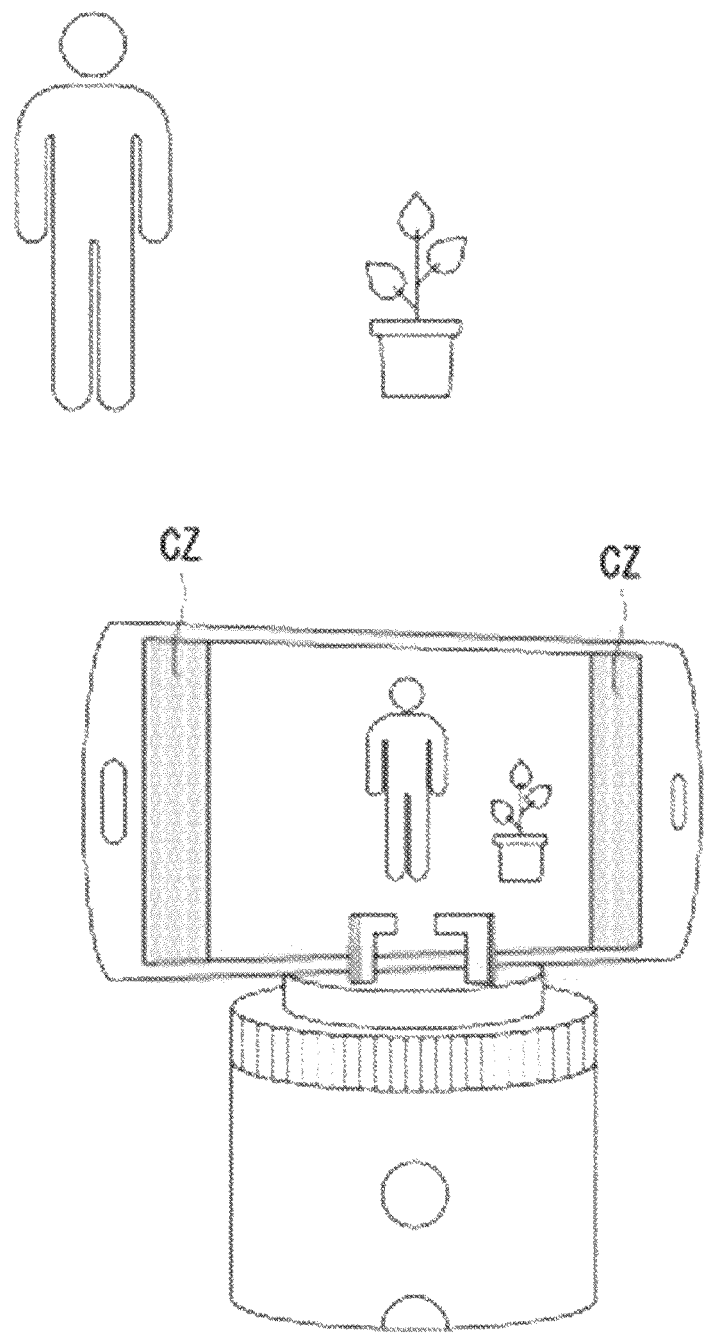
Figure 18:
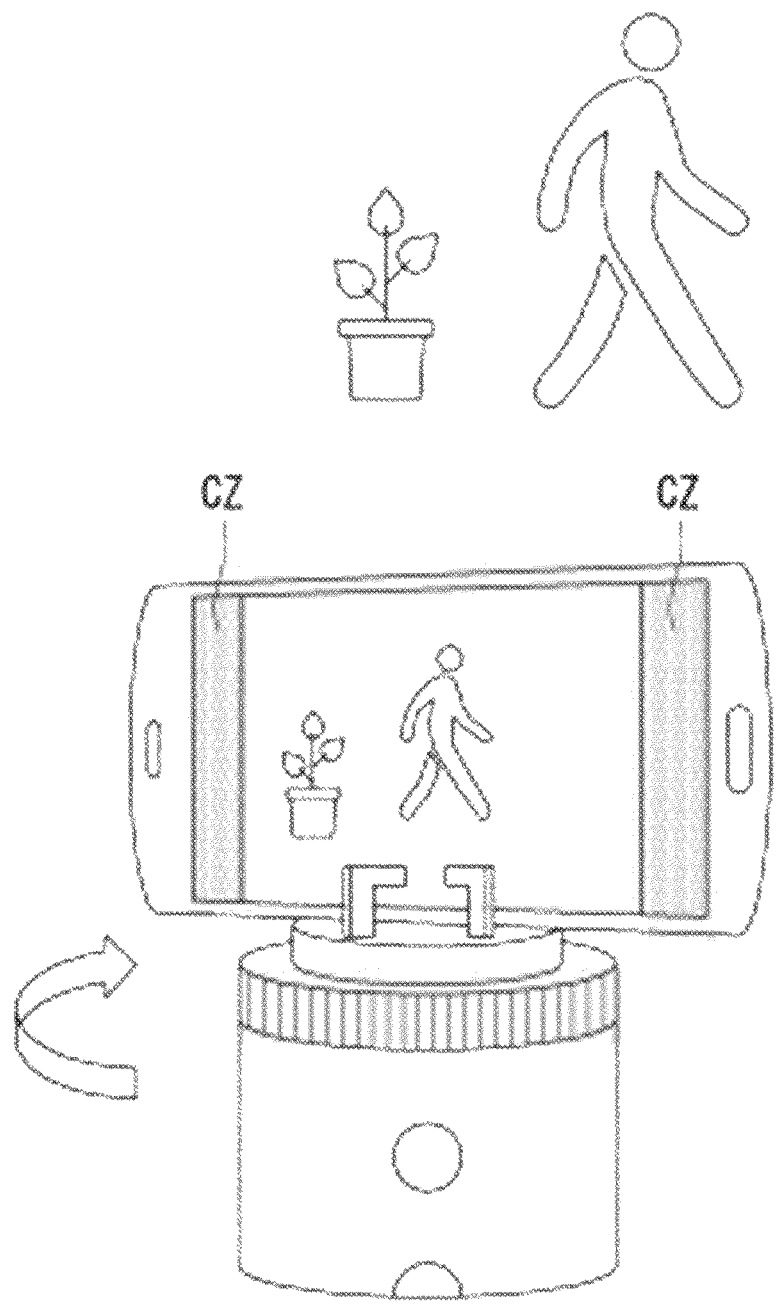
Figure 19:
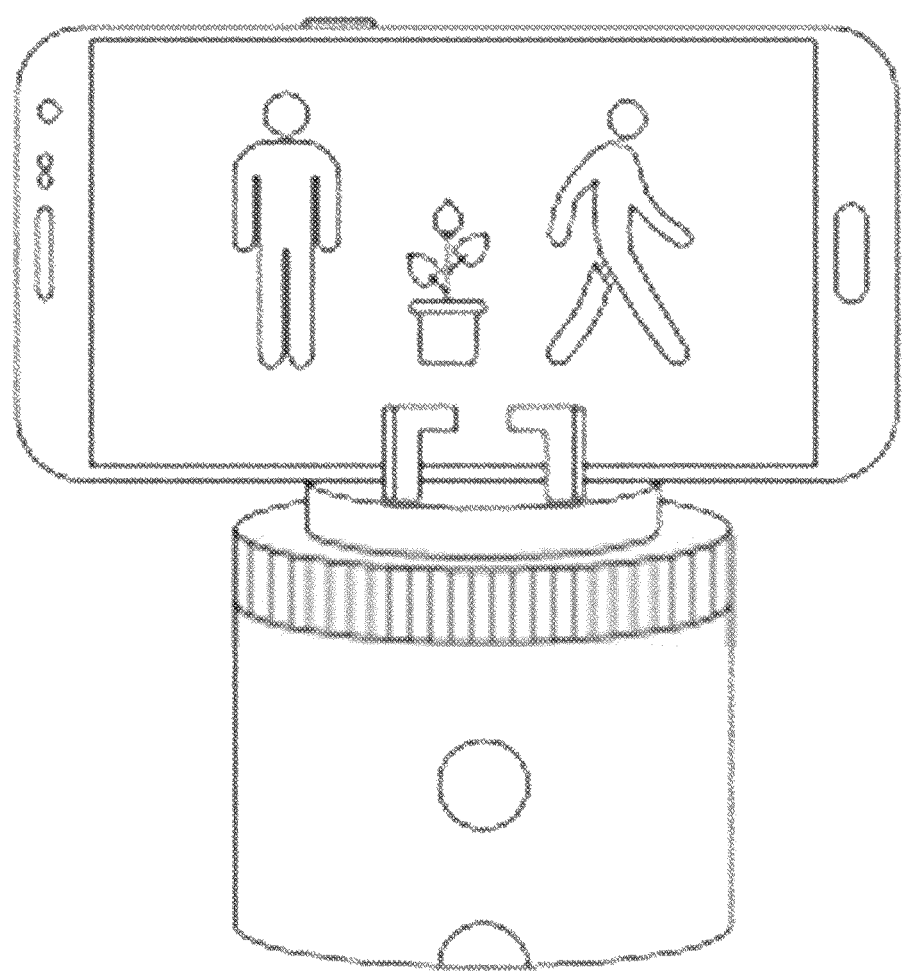

FIG. 17 illustrates an example in which the mobile device 200 held by the mobile device cradle 100 obtains a first image in a first image capturing direction 501, FIG. 18 illustrates an example in which the mobile device cradle 100 is driven so that the mobile device 200 faces a second image capturing direction which is different from the first image capturing direction to obtain a second image in the second image capturing direction, and FIG. 19 illustrates an example in which a composite image is generated using the first image and the second image.

As illustrated in FIGS. 17 to 19, the processor 260 may combine the images on the basis of a common portion of two images to generate the composite image when the first image and the second image are combined.

One example of image combination performed by the processor 260 will be described with reference to FIGS. 20 to 24.

Figure 20:
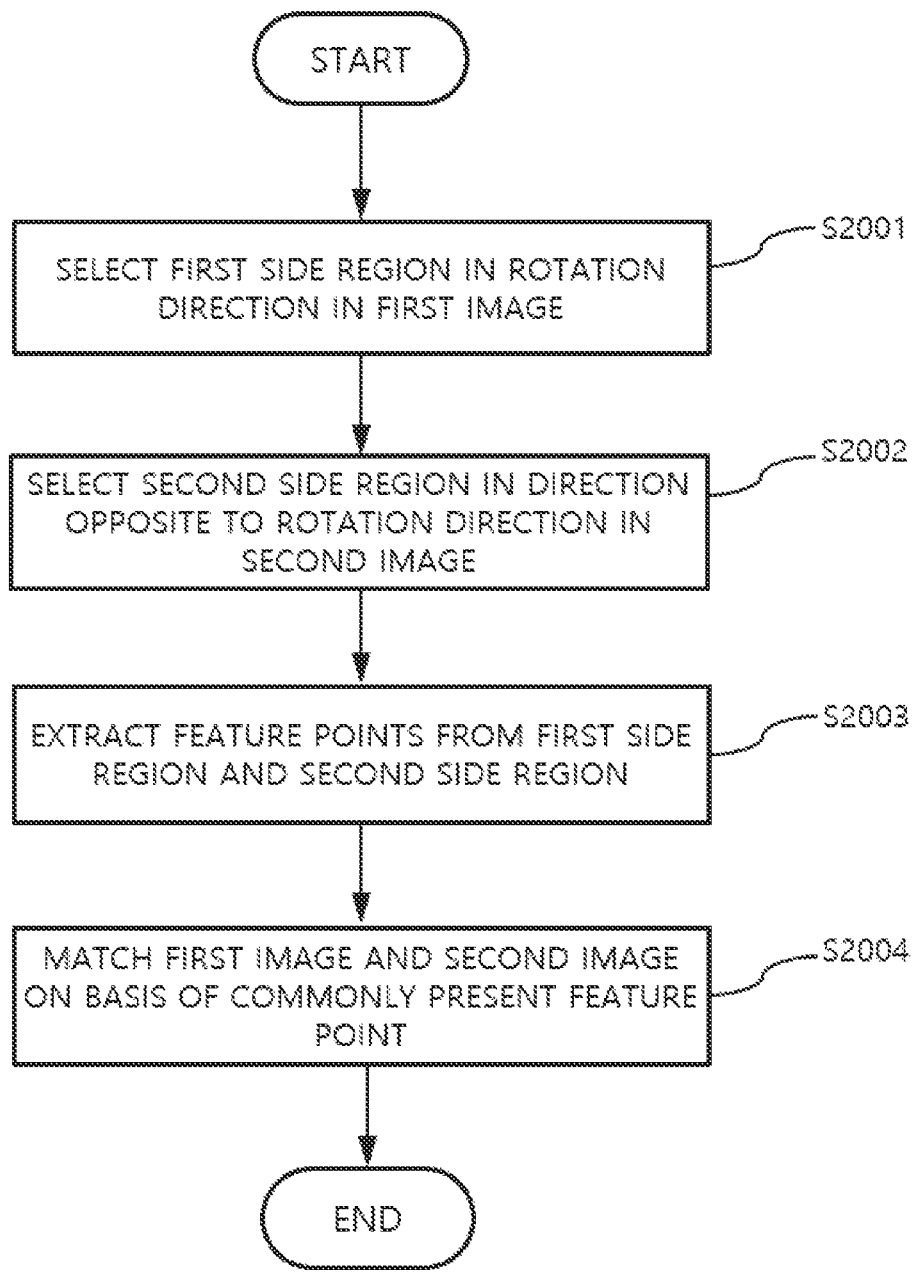
FIG. 20 is a flowchart for describing one example of image combination performed by a processor according to one embodiment disclosed in the present specification.

FIG. 20 is a flowchart for describing one example of image combination performed by a processor according to one embodiment disclosed in the present specification, and FIGS. 21 to 24 are views for describing one example illustrated in FIG. 20.

The processor 260 may select a first side region corresponding to a rotation operation for a first image obtained in a first image capturing direction (S2001).

Similarly to the above-described example, in FIGS. 21 to 24, an example of obtaining the first image in the first image capturing direction, rotating in a right direction of a screen to face a second image capturing direction, and obtaining a second image will be described.

Figure 21:
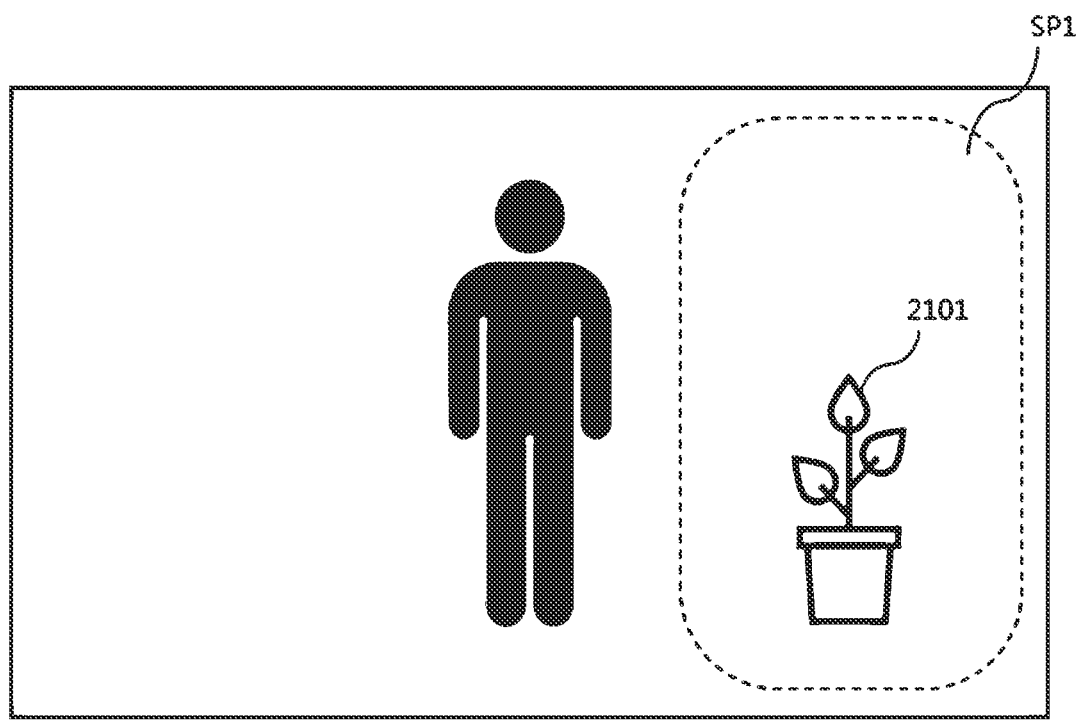
FIG. 21, FIG. 22, FIG. 23, and FIG. 24 are views for describing one example illustrated in FIG. 20.

As illustrated in FIG. 21, the processor 260 may select a right side region of the first image obtained in the first image capturing direction. This is to set a common region for image combination in the right side region of the first image because an image capturing direction is changed to the right direction after the first image is captured.

Figure 22:
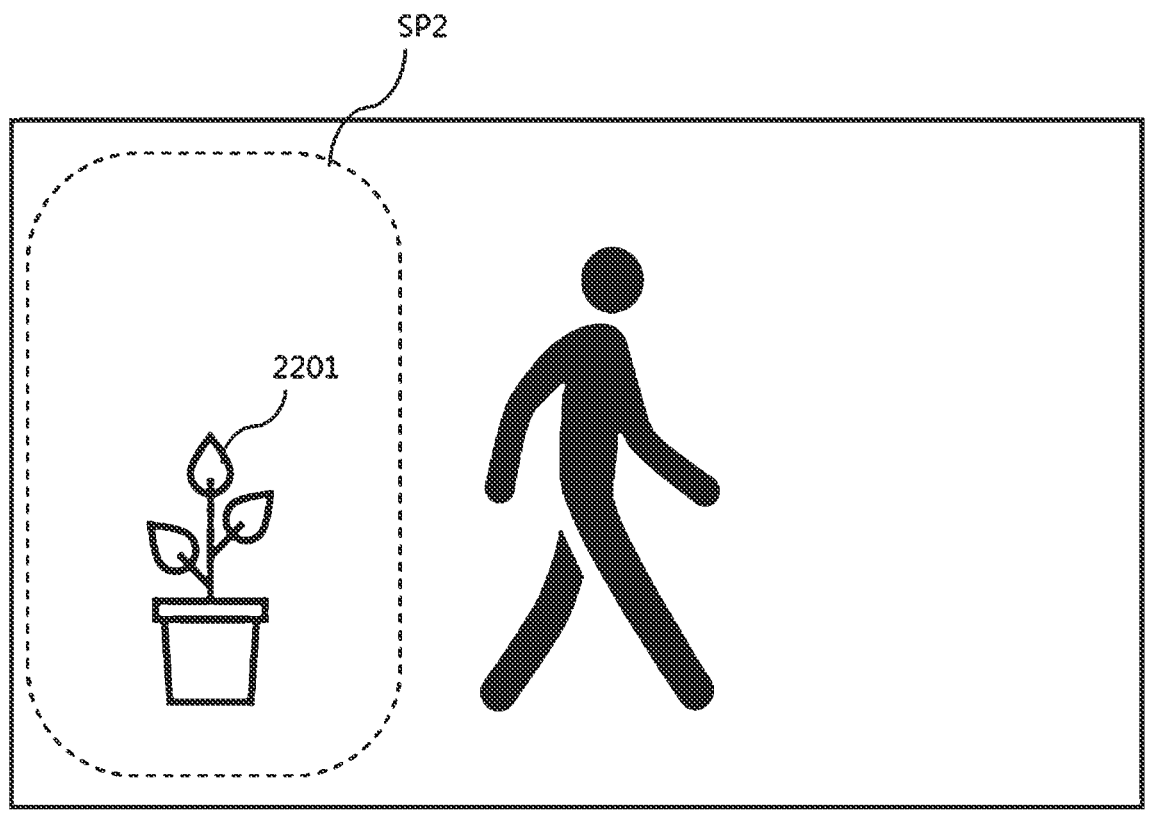

Then, as illustrated in FIG. 22, the processor 260 may select a second side region SP2 in a side opposite to a rotation direction in a second image obtained in the second image capturing direction. That is, this is to set a common region for image combination in a left side region in the second image because the second image is an image captured after the mobile device cradle 100 rotates in a left direction.

The processor 260 may extract feature points from each of a first side region SP1 of the first image and the second side region SP2 of the second image (S2003). The processor 260 may match the first image and the second image to generate a composite image on the basis of the feature point commonly present on the two side regions (S2004).

That is, in an example of FIG. 21, the processor 260 may extract the feature points of the first side region SP1 of the first image, and accordingly, extract feature points of a flowerpot 2101 present in the first side region SP1.

In addition, in an example of FIG. 22, the processor 260 may extract feature points of the second side region SP2 of the second image, and accordingly, extract feature points of the flowerpot 2201 in the second side region SP2.

At least a part of the first side region SP1 of the first image may correspond to at least a part of the second side region SP2 of the second image. In this case, image matching may be performed using a common portion between the first side region SP1 of the first image and the second side region SP2 of the second image.

Figure 23:
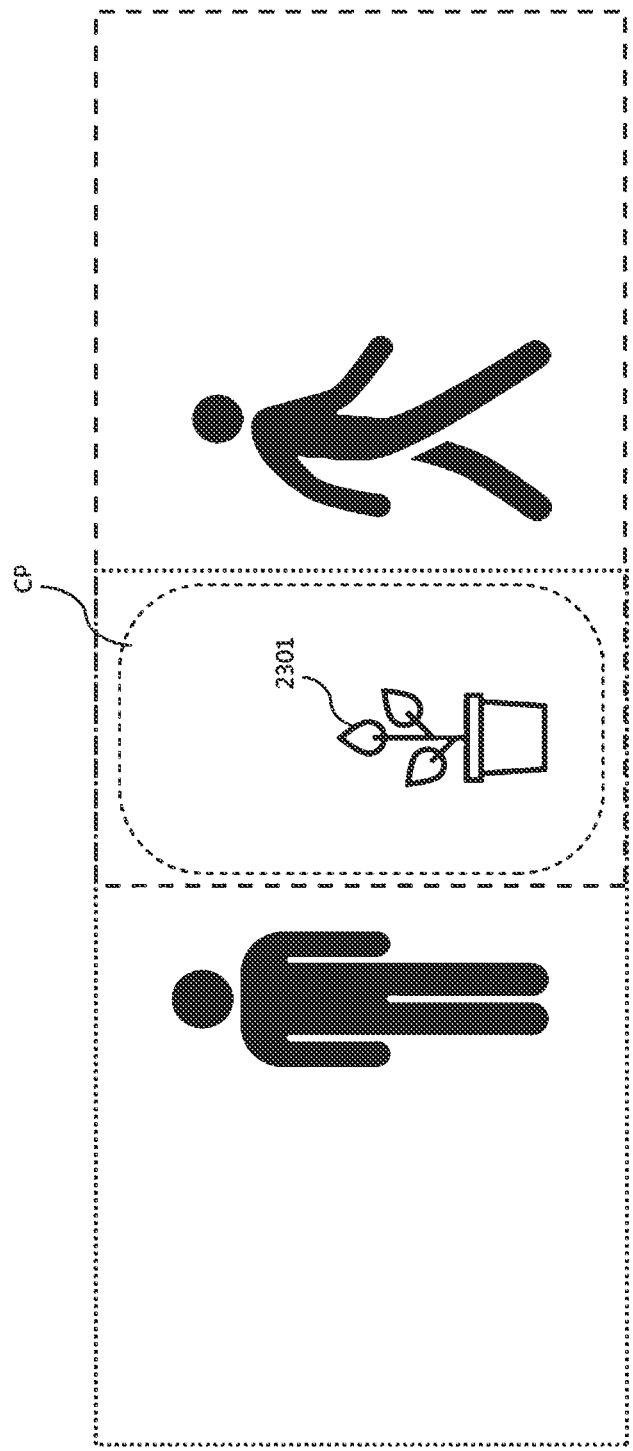

In an example of FIG. 23, the processor 260 may match the first image and the second image on the basis of a feature point of the flowerpot 2301 commonly present in the first side region SP1 of the first image and the second side region SP2 of the second image.

Figure 24:
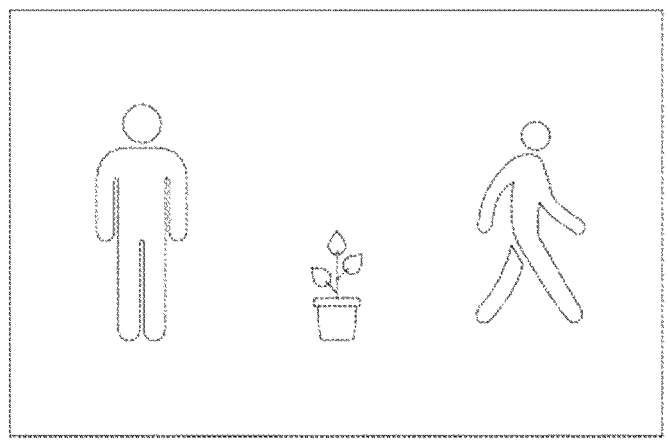

In FIG. 24, an example of a composite image formed by combining the first image and the second image and matching a preset resolution is illustrated.

The composite image illustrated in FIG. 24 includes the common portion—flowerpot—between the first image and the second image in a central portion, and two side portions include the at least a part of the first image and the at least a part of the second image.

According to the embodiment, the first image and the second image may be the same type image or different type images. For example, image types may be divided into a still image and a moving image. As an example, the at least a part of the first image may be a static still image, and the at least a part of the second image may be a moving picture which is a moving image. As described above, when one element (first image) of the composite image is the still image and the remaining one element (second image) is the moving image, the processor 260 may set the same still image corresponding to each frame of the moving image as a combination target image so that sequential frames of still images and the sequential frames of moving images are combined.

As one embodiment disclosed in the present specification, when an image is captured, the processor 260 may display a capturing image being captured on the display part 231 and display a clear zone on the capturing image at the same time.

The clear zone is a zone displayed on an edge portion of an image which may become a target of image combination, and an interface having a meaning of guiding the user not to position a subject in the clear zone is displayed on the clear zone. Since a portion on which the clear zone is displayed may correspond to the above-described common portion—or at least a portion of the above-described common portion—which becomes a reference of the image combination, accuracy of the image combination can be improved, and failure of a composite image can be prevented by removing the subject in the clear zone.

Referring to the example of FIG. 17, a clear zone may be displayed on a first capturing image in the first image capturing direction. In this case, the capturing image is an image being captured by the camera and displayed through the display part. The processor 260 may mark and display a clear zone CZ on an edge portion of the captured image. The clear zone may be displayed in various manners such as shading, dashing, and dotting.

As in the example of FIG. 18, a clear zone may be displayed on a second capturing image in the second image capturing direction. That is, when the second capturing image in the second image capturing direction is displayed, the processor 260 may mark and display a clear zone CZ on an edge portion of the second capturing image.

The present invention relates to a mobile device and a method of controlling a mobile device cradle, and since the mobile device can control driving of the mobile device cradle to capture an image even in a situation in which a subject moves, capture images at different angles, and easily combine the images, there is a high possibility of industrial applicability.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A mobile device which is held by a mobile device cradle, establishes a communication connection with the mobile device cradle, and controls the mobile device cradle to be driven, the mobile device comprising:
   at least one camera which generates a forward image; and
   at least one processor which detects a subject from the forward image and controls a mobile device cradle to be driven so that a forward direction of the mobile device follows the subject according to movement of the subject,
   wherein the at least one processor determines a following direction on the basis of a position of the subject in the forward image,
   wherein, when the subject deviates from a forward image, the at least one processor sets a deviation direction of the subject from a position of the subject detected previously, and generates a control signal so that the mobile device cradle is driven in a direction corresponding to the deviation direction.

2. The mobile device of claim 1, wherein:
   the mobile device cradle receives a driving control signal from the mobile device and performs a driving operation of changing the forward direction of the mobile device to a first driving direction or a second driving direction different from the first driving direction according to the received driving control signal; and
   the at least one processor generates the driving control signal to set a driving direction of the mobile device cradle to correspond to the following direction.

3. The mobile device of claim 2, wherein the at least one processor, which operates in conjunction with the mobile device cradle, determines the following direction so that the subject is positioned in a preset partial region in the forward image.

4. The mobile device of claim 3, wherein, when the position of the subject deviates from the preset partial region, the at least one processor, which operates in conjunction with the mobile device cradle, determines the following direction so that the subject is positioned in the preset partial region.

5. The mobile device of claim 3, wherein, when the subject deviates from the preset partial region and is positioned on one side surface of the preset partial region, the at least one processor, which operates in conjunction with the mobile device cradle, generates the driving control signal so that the mobile device cradle is driven in a first driving direction toward the one side surface.

6. The mobile device of claim 3, wherein the at least one processor, which operates in conjunction with the mobile device cradle, sets a driving speed on the basis of a distance between the position of the subject and the preset partial region in the forward image.

7. The mobile device of claim 3, wherein:
   the at least one processor, which operates in conjunction with the mobile device cradle, selects a frame with respect to the forward image at each preset time interval and determines a following direction with respect to the selected frame on the basis of a positional relationship between a position of the subject in the selected frame and the preset partial region; and
   the following direction with respect to the selected frame is regardless of a following direction with respect to a previously selected frame.

8. The mobile device of claim 3, wherein, when the subject deviates from a screen of the forward image in a deviation direction, the at least one processor, which operates in conjunction with the mobile device cradle, distinguishes the deviation direction into a first-axis deviation direction and a second-axis deviation direction and determines a driving direction using at least one of the first-axis deviation direction and the second-axis deviation direction.

9. The mobile device of claim 3, wherein, when the subject deviates from a screen of the forward image in a deviation direction, the at least one processor, which operates in conjunction with the mobile device cradle, generates the driving control signal so that the mobile device cradle is driven at a highest rotation speed in the driving direction corresponding to the deviation direction.

10. The mobile device of claim 9, wherein, when the subject is redetected in the forward image while the mobile device cradle is driven at the highest rotation speed in the driving direction, the at least one processor, which operates in conjunction with the mobile device cradle, changes the highest rotation speed to a basic rotation speed.

11. A method of controlling a mobile device cradle, which is performed by a mobile device held by the mobile device cradle and configured to control the mobile device cradle to be driven, the method comprising:
    obtaining a forward image;
    detecting a subject from the forward image;
    controlling a mobile device cradle to be driven so that a forward direction of the mobile device follows the subject according to movement of the subject;
    setting a deviation direction of the subject from a position of the subject detected previously when the subject deviates from a forward image; and
    generating a control signal so that the mobile device cradle is driven in a direction corresponding to the deviation direction, in response to the setting the deviation direction of the subject.

12. The method of claim 11, wherein:
    the mobile device cradle performs a rotation operation so that the forward direction of the mobile device faces a first direction or second direction opposite to the first direction with respect to the forward direction in a state in which the mobile device cradle holds the mobile device;
    the controlling of the mobile device cradle to be driven includes generating a control signal for the rotation operation of the mobile device cradle so that the forward direction of the mobile device follows the subject and providing the generated control signal to the mobile device cradle.

13. The method of claim 12, wherein the generating of the control signal for the rotation operation includes generating a control signal for the rotation operation so that the subject is positioned in a central portion in the forward image.

14. The method of claim 12, wherein, when the subject is not positioned in a central portion in the forward image, the generating of the control signal for the rotation operation includes generating a control signal for the rotation operation so that the subject is positioned in the central portion of the forward image.

15. The method of claim 14, wherein, when the detected subject is positioned in a side portion in the first direction instead of the central portion of the forward image, the generating of the control signal for the rotation operation so that the subject is positioned in the central portion of the forward image includes setting a rotation direction of the mobile device cradle to the first direction so that the subject is positioned in the central portion.

16. The method of claim 12, wherein the generating of the control signal for the rotation operation includes generating a control signal for the rotation operation by setting a rotation speed on the basis of a distance between the position of the subject in the forward image and a central portion of the forward image.

17. A non-transitory computer-readable storage medium storing instructions executable by one or more processors of a mobile device,
wherein, when the instructions are executed by the mobile device, which is held by a mobile device cradle and controls the mobile device cradle to be driven, the mobile device performs:
an operation of obtaining a forward image;
an operation of detecting a subject from the forward image; and
an operation of controlling a mobile device cradle to be driven so that a forward direction of the mobile device follows the subject according to movement of the detected subject;
an operation of setting a deviation direction of the subject from a position of the subject detected previously when the subject deviates from a forward image; and
an operation of generating a control signal so that the mobile device cradle is driven in a direction corresponding to the deviation direction, in response to the setting the deviation direction of the subject.

18. A mobile device which is held by a mobile device cradle, establishes a communication connection with the mobile device cradle, and controls the mobile device cradle to be driven, the mobile device comprising:
at least one camera configured to generate a forward image; and
at least one processor configured to control the cradle so that the camera to be rotated to face a second image capturing direction after obtaining a first image in a first image capturing direction, and obtain a second image in the second image capturing direction;
wherein the processor further configured to select a first side region of the first image obtained in the first image capturing direction, select a second side region in a side opposite to a rotation direction in a second image obtained in the second image capturing direction, and match the first image and the second image to generate a composite image on the basis of a common portion between the first side region of the first image and the second side region of the second image.

* * * * *